United States Patent
Szeredi et al.

(10) Patent No.: US 11,237,963 B2
(45) Date of Patent: Feb. 1, 2022

(54) SHARED FILESYSTEM METADATA CACHING

(71) Applicant: Red Hat, Inc., Raleigh, NC (US)

(72) Inventors: Miklos Szeredi, Piliscsaba (HU); Stefan Hajnoczi, St. Neots (GB); Vivek Goyal, Westford, MA (US); David Alan Gilbert, Manchester (GB)

(73) Assignee: Red Hat, Inc., Raleigh, NC (US)

( * ) Notice: Subject to any disclaimer, the term of this patent is extended or adjusted under 35 U.S.C. 154(b) by 78 days.

(21) Appl. No.: 16/265,551

(22) Filed: Feb. 1, 2019

(65) Prior Publication Data
US 2020/0250092 A1 Aug. 6, 2020

(51) Int. Cl.
*G06F 12/00* (2006.01)
*G06F 13/00* (2006.01)
*G06F 12/0806* (2016.01)
*G06F 16/172* (2019.01)

(52) U.S. Cl.
CPC ........ *G06F 12/0806* (2013.01); *G06F 16/172* (2019.01); *G06F 2212/1008* (2013.01); *G06F 2212/608* (2013.01)

(58) Field of Classification Search
CPC ............... G06F 12/0806; G06F 16/172; G06F 2212/1008; G06F 2212/608
USPC ........................................................ 711/119
See application file for complete search history.

(56) References Cited

U.S. PATENT DOCUMENTS

| 6,098,079 | A  | * | 8/2000  | Howard ............... G06F 16/137 |
| 6,766,334 | B1 | * | 7/2004  | Kaler .......................... G06F 8/71 |
| 6,772,161 | B2 | * | 8/2004  | Mahalingam ......... G06F 16/119 |
| 7,739,236 | B2 | * | 6/2010  | Haswell ............... G06F 16/119 707/610 |
| 7,908,339 | B2 | * | 3/2011  | Keith, Jr. ............... G06F 16/188 709/217 |
| 9,244,679 | B1 | * | 1/2016  | Arellano .................... G06F 8/71 |
| 9,418,097 | B1 | * | 8/2016  | Chmelev ................. G06F 16/16 |
| 10,108,800 | B1 | * | 10/2018 | Surdu ................... G06F 21/575 |
| 2003/0074394 | A1 | * | 4/2003  | Eshghi ..................... H04L 29/06 709/203 |
| 2004/0117585 | A1 | * | 6/2004  | Glider ................... G06F 3/0664 711/202 |
| 2006/0206547 | A1 | * | 9/2006  | Kulkarni ............. G06F 11/1451 |
| 2006/0288056 | A1 | * | 12/2006 | Yamakawa ......... G06F 16/1873 |
| 2008/0019351 | A1 | * | 1/2008  | Piper ..................... G06F 9/5033 370/352 |
| 2008/0294704 | A1 | * | 11/2008 | Akagawa ............ G06F 11/1469 |

(Continued)

*Primary Examiner* — Sheng Jen Tsai
(74) *Attorney, Agent, or Firm* — K&L Gates LLP

(57) ABSTRACT

Shared filesystem metadata caching is disclosed. For example, a system includes a guest with a storage controller (SC) and a metadata cache on a host with a filesystem daemon (FSD), and a host memory storing a registration table (RT). The SC receives a first metadata request associated with a file stored in the host memory. A first version identifier (VID) of metadata associated with the file is retrieved from the metadata cache and validated against a corresponding second VID in the RT. Upon determining the first VID matches the second VID, the SC responds to the first metadata request based on the metadata. Upon determining the first VID fails to match the second VID, the SC requests the FSD to update the metadata. The first VID is updated to match the second VID and the SC responds to the first metadata request based on the updated metadata.

19 Claims, 10 Drawing Sheets

(56) References Cited

U.S. PATENT DOCUMENTS

| | | | |
|---|---|---|---|
| 2009/0240791 A1* | 9/2009 | Sakurai | G06F 8/65 709/221 |
| 2009/0271412 A1* | 10/2009 | Lacapra | H04L 67/104 |
| 2010/0077362 A1* | 3/2010 | Allred | H04L 67/34 715/866 |
| 2011/0029964 A1* | 2/2011 | Kobayashi | G06F 8/656 717/171 |
| 2011/0055155 A1* | 3/2011 | Page | G06F 8/658 707/625 |
| 2011/0141347 A1* | 6/2011 | Suh | H04H 20/40 348/426.1 |
| 2011/0246986 A1* | 10/2011 | Nicholas | G06F 9/45545 718/1 |
| 2013/0332916 A1* | 12/2013 | Chinn | G06F 8/65 717/169 |
| 2014/0245278 A1* | 8/2014 | Zellen | G06F 8/65 717/170 |
| 2015/0370827 A1* | 12/2015 | Parkison | G06F 16/1844 707/626 |
| 2016/0124987 A1* | 5/2016 | Plumb | G06F 16/1767 707/827 |
| 2016/0125195 A1* | 5/2016 | Plumb | G06F 21/6218 726/30 |
| 2016/0179559 A1* | 6/2016 | Senda | G06F 9/45545 718/1 |
| 2017/0060936 A1* | 3/2017 | Gammans | G06F 16/2358 |
| 2017/0177611 A1* | 6/2017 | Gowdappa | G06F 16/182 |
| 2019/0087432 A1* | 3/2019 | Sion | G06F 21/62 |
| 2020/0242263 A1* | 7/2020 | Hajnoczi | G06F 9/5016 |
| 2020/0242264 A1* | 7/2020 | Hajnoczi | G06F 21/53 |

* cited by examiner

SHARED FILESYSTEM METADATA CACHING

BACKGROUND

The present disclosure generally relates to virtualized computer systems. For scalability and efficiency reasons, many computer systems employ virtualized guests such as virtual machines and containers to execute computing tasks performed by the computing systems, such as for hosting application programs. Typically, guests such as containers and virtual machines may be launched to provide extra compute capacity, while isolating compute resources used by different users and tenants away from those of other users. Guests enable rapid scaling of application deployments to the volume of traffic requesting the applications, and allow applications to be deployed in a variety of hardware hosting environments. Multiple guests may also be clustered together to perform more complex functions than the respective guests are capable of performing individually. To interact with a broader set of users and a broader computing ecosystem, guests typically employ virtualized devices such as virtualized memory devices and virtualized input/output ("I/O") devices controlled by drivers. Storage provided to a guest via a virtualized memory device may be organized with a virtualized filesystem to allow a guest to interface with the storage.

SUMMARY

The present disclosure provides a new and innovative system, methods and apparatus for shared filesystem metadata caching. In an example, a metadata caching system for shared filesystems includes a host with (i) a processor, (ii) a guest with a storage controller (SC) and a metadata cache, associated with a filesystem daemon (FSD), and (iii) a host memory storing a registration table (RT). The SC is configured to receive a first metadata request associated with a file stored in the host memory. A first version identifier (VID) of metadata associated with the file is retrieved from the metadata cache. The first VID is validated against a corresponding second VID in the RT. In response to determining that the first VID matches the second VID, the SC responds to the first metadata request based on the metadata in the metadata cache. In response to determining that the first VID fails to match the second VID, the SC sends a second metadata request to the FSD, based on the first metadata request, to update the metadata. The first VID is updated to match the second VID and the SC responds to the first metadata request based on the updated metadata.

Additional features and advantages of the disclosed method and apparatus are described in, and will be apparent from, the following Detailed Description and the Figures.

DETAILED DESCRIPTION OF EXAMPLE EMBODIMENTS

Figure 1:
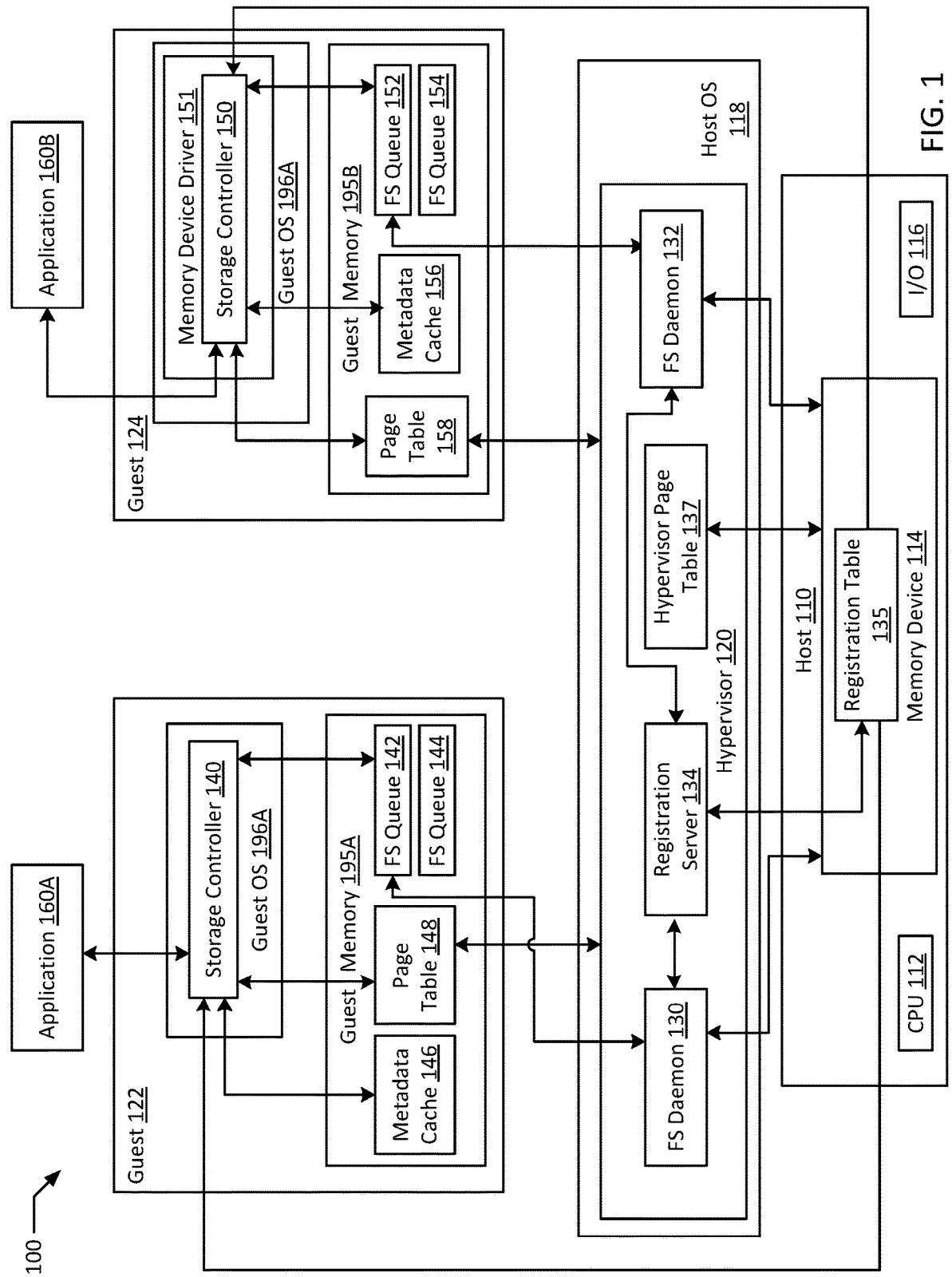
FIG. 1 is a block diagram of a system implementing shared filesystem metadata caching according to an example of the present disclosure.

In many computer systems, physical hardware may host guests such as virtual machines and/or containers. In an example, a virtual machine ("VM") may be a robust simulation of an actual physical computer system utilizing a hypervisor to allocate physical resources to the virtual machine. In sharing physical computing resources, guests and/or a hypervisor controlling them, may also have access to shared components of the underlying host, for example, I/O devices (e.g., network interface cards ("NICs"), storage controllers, USB controllers, PS2 interfaces, etc.) and memory devices (e.g., transient memory (e.g., DRAM), hard drive disks ("HDD"), solid state drives ("SSD"), persistent memory (e.g., Non-Volatile Dual In-line Memory Module ("NVDIMM")), etc.). However, such access is typically restricted through a virtualization manager such as a hypervisor to ensure that virtual environments remain segregated and to prevent unauthorized access to the resources of other virtual environments on the same host, and/or unauthorized access to the host itself. In many cases, direct access to physical hardware, including physical I/O devices and memory, may be configured to require elevated access to prevent security risks from giving guest userspace components (e.g., applications executing without elevated rights) access to these physical components. For example, with rights to directly manipulate memory, a malicious user with limited user access to a system may be able to read the data of other accounts and/or execute destructive or other malicious code.

Guests deployed on the same host, whether physical or virtual, may often share certain characteristics. For example, these guests may share host specific configurations. These guests may also share processing tasks, for example, a first guest on the host may pass its results to a second guest for further processing. Therefore, it is often advantageous from a latency perspective to allow different guests on the same host system to share data through sharing memory access between the guests and also their host. For example, a host memory address may be mapped to two separate guests allowing both guests access to the data stored in the host memory address location. However, such access may present potential security risks, as isolating guests' memory access is often a key feature of allowing virtualized guests to operate as independent computing systems on the same hardware node. Therefore, even though memory sharing may be advantageous from a processing latency perspective, memory sharing implementations are typically less secure than communication via a networking protocol. For example, two systems that share access to the same memory will naturally also have a degree of control over each other's memory space (e.g., the shared memory addresses), which presents a possible vector for gaining unauthorized access to each other's memory contents. In a typical memory sharing implementation, a supervisor (e.g., kernel) of a source guest may typically require a degree of control over guest physical addresses (GPAs) of a destination guest in order to manage memory access to the memory addresses where the source guest has stored data. A supervisor of the destination guest may then map these GPAs to guest virtual addresses (GVAs) in the destination guest to allow programs in the destination guest to access this data. Shared memory access by guests hosted on the same system is typically provided by a hypervisor managing memory access for both the source and destination guests. However, in such an implementation, the source guest's kernel has elevated access to the destination guest's memory mappings creating a potential security risk. For example, having control over a destination guest's memory mappings typically requires that the source guest's kernel is able to instruct the hypervisor to perform memory operations outside of the source guest's memory space (e.g., in the destination guest's memory space), potentially including granting the source guest control over certain hypervisor page table entries. The potential security risks associated with sharing memory with other guests would be further elevated in scenarios where access is granted to host memory and not just memory of other guests. For example, a malicious actor who gains access to a guest with access to host memory may be able to read data stored by the host as well as other guests on the same physical system.

Virtualized guests may typically be implemented in several different ways (e.g., full virtualization, paravirtualization/hybrid virtualization, OS level virtualization). In fully virtualized systems, guests are unaware that they have been virtualized at all, and their guest operating systems issue hardware commands that are received by emulated hardware devices in the hypervisor. Fully virtualized systems allow for the greatest flexibility for running code in a guest that is incompatible with the host's operating system. In paravirtualization or hybrid virtualization models, at least some components in the guest know that the guest is virtualized, and rather than submitting hardware commands to a hypervisor, such guests are typically configured with drivers that pass software requests on to the hypervisor, allowing the hypervisor to interface with the hardware. Paravirtualized guests may be configured with virtual I/O devices (e.g., network devices, storage devices) that appear to applications executing on the guest as actual physical I/O devices, when, in actuality, these virtual devices are actually configured to forward I/O commands and messages to corresponding devices on the guest's host that actually interact with physical networking or storage devices. In these paravirtualized implementations, the guest operating system, or at least virtual devices and/or virtual device drivers, would typically be aware that the virtual devices are virtualized. The virtual devices would work in conjunction with their host's hypervisor to deliver enhanced performance in a paravirtualization model as compared to having the hypervisor fully emulate a device for the guest to use. Paravirtualization implementations include standards such as Virtio, Xen®, and VMWare Guest Tools®. OS level virtualization is most commonly implemented in the form of containers (e.g., Docker®) where the guest is not configured to execute a full operating system, instead directly interfaces with its host's OS (e.g., for I/O operations). OS level virtualization incurs the least overhead, however, OS level virtualization requires that guests execute code that is compatible with their host's OS.

Programs, whether executing on a physical host or in a virtualized guest, may typically require some form of persistent storage (e.g., storage where data persists after a loss of power) to store current execution states of the programs. Persistent storage devices (e.g., HDDs, SSDs, persistent memory, etc.) may typically be configured with a filesystem that provides a structure for accessing and retrieving the data stored in the storage device. Operating systems, whether on a host or a guest, may additionally be configured with virtual filesystems, which provide an abstraction layer on top of hardware filesystems. Virtual filesystems may be implemented to provide a uniform interface for interacting with different hardware filesystems that may be implemented with incompatible interfaces. For example, Filesystem in Userspace ("FUSE") is a filesystem virtualization implementation that allows non-privileged users to create and mount virtual filesystems. FUSE is designed to provide less privileged accounts (e.g., non-privileged users) an interface to define file access rights without modifying privilege restricted code of supervisors (e.g., kernel code). In a typical FUSE implementation, a user file request is sent by a storage controller in the kernel back to a filesystem daemon executing in userspace to be processed. This allows a virtual filesystem defined in userspace to behave as if it is a filesystem directly controlling access to a storage device mounted to the kernel when a userspace application interacts with the virtual filesystem.

As further disclosed herein, using paravirtualization protocols to transport commands and requests between guests and hosts sharing memory access via a virtual filesystem may allow for secure memory sharing with significantly less access latency as compared to networking protocols. However, in such implementations, filesystem queries that may ordinarily be answered by metadata operations (e.g., retrieving a modification timestamp, determining whether a file exists, determining a file's path, determining a file's access permissions, etc.) would typically require querying via the paravirtualization protocol instead of being performed against a cached version of the metadata in the filesystem. Due to shared filesystems being shared by multiple systems, a local cache on any one system (e.g., guest) may well be stale resulting in incorrect query results if the stale, cached data is used to respond to a query.

Typically, a significant proportion of file operation commands received by an operating system may be handled via metadata operations (e.g., upwards of 50%). In shared virtual filesystems, file operations are typically handled by a component with elevated access to physical storage (e.g., a host operating system or hypervisor). Therefore, file operations, including metadata operations, would typically include a communication step between a guest and the hypervisor or host OS. These communications may require context switches and/or queue I/O that may be several orders of magnitude slower than a direct memory to main physical memory by the guest (e.g., 10-100 ns for a memory read vs. 1,000-10,000 ns for a context switch). To avoid unnecessary context switches and communications with a guest's host OS or hypervisor, the present disclosure provides for metadata caching. Metadata caching as disclosed herein for paravirtualized virtual filesystem implementations is implemented with local metadata caches on each guest that accesses a shared virtual filesystem, in conjunction with a registration table stored in host memory to which each guest is provided direct read only access. A supervisor of the host (e.g., a host operating system, hypervisor, etc.) of the paravirtualized virtual filesystem with read-write access to the registration table is configured to detect or to be notified of each request to update any file in the shared filesystem with a corresponding entry in the registration table. Once such an update request is detected, the registration table, which includes a version identifier (e.g., a counter) is updated (e.g., by incrementing the counter). Each guest may then quickly identify if the metadata in its respective metadata cache is current by comparing a cached version identifier against a current version identifier retrieved from the registration table. Each of these version identifier retrievals may typically be a memory read that requires 10 ns (e.g., for data in a CPU cache) to 100 ns (e.g., for data in DRAM). In such examples, instead of requesting a host supervisor or hypervisor to perform metadata operations in a shared filesystem, a guest may instead perform these metadata operations with cached metadata (e.g., a direct memory read requiring around 100 ns). Verifying whether the cache is stale may typically be performed without requesting elevated access or communicating with the hypervisor or host OS. Memory reads for a current version identifier in the registration table and metadata cache, and a subsequent memory read for current metadata in the cache would typically require 100 ns-200 ns, which would typically be at least ten times (often 100 times or more) faster than sending a request from a guest to the hypervisor to retrieve current metadata, which typically requires a two way communication cycle that may take 1,000 ns to 10,000 ns each way. Therefore, a guest performing metadata operations from a metadata cache without invoking a host supervisor may result in significant processing efficiency improvements and request latency reduction.

FIG. 1 is a block diagram of a system implementing shared filesystem metadata caching according to an example of the present disclosure. The system 100 may include one or more host(s) 110. In an example, host 110 is a physical host, with physical processors (e.g., CPU 112), physical memory device(s) (e.g., memory device 114), and physical I/O devices (e.g., I/O 116). Host 110 may also be a virtual machine with corresponding virtualized components. In either example, host 110 would appear to guests executing on host 110 (e.g., guests 122 and 124) as a physical host. As used herein, processor or processors 112 refer to devices capable of executing instructions encoding arithmetic, logical, and/or I/O operations. In one illustrative example, a processor may follow Von Neumann architectural model and may include an arithmetic logic unit (ALU), a control unit, and a plurality of registers. In an example, a processor may be a single core processor which is typically capable of executing one instruction at a time (or process a single pipeline of instructions), or a multi-core processor which may simultaneously execute multiple instructions. In another example, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU").

As discussed herein, memory device 114 refers to volatile or non-volatile memory devices, such as RAM, ROM, EEPROM, or any other device capable of storing data. As discussed herein, I/O device(s) 116 refer to devices capable of providing an interface between one or more processor pins and an external device, the operation of which is based on the processor inputting and/or outputting binary data. For example, a network interface card may be an example of an I/O device through which host 110 and guests 122 and/or 124 hosted on host 110 communicates with external systems over a network. CPU(s) 112 may be interconnected using a variety of techniques, ranging from a point-to-point processor interconnect, to a system area network, such as an Ethernet-based network. Local connections within host 110, including the connections between processor 112 and a memory device 114 and between processor 112 and I/O device 116 may be provided by one or more local buses of suitable architecture, for example, peripheral component interconnect (PCI).

In an example, host 110 may host one or more guests, for example, guest 122 and 124. In an example guests may be VMs and/or containers, which may host additional nested layers of guests. For example applications 160A or B may be another virtual guest nested inside of guest 122 or 124. In an example, a container as referred to herein may be implemented with any form of operating system level virtualization, for example, Red Hat® OpenShift®, Docker® containers, chroot, Linux®-VServer, FreeBSD® Jails, HP-UX® Containers (SRP), VMware ThinApp®, etc. Containers may run directly on a host operating system or run within another layer of virtualization, for example, in a virtual machine. In an example, containers that perform a unified function may be grouped together in a container cluster that may be deployed together (e.g., in a Kubernetes® pod). In an example, guest 122 may be a VM executing on host 110. In an example, guest 122 may be a container executing on a physical or virtual host (e.g., host 110). In addition, containers and/or VMs may further host other guests necessary to execute their configured roles (e.g., a nested hypervisor or nested containers). For example, a VM (e.g., guest 122) and/or a container may further host a Java® Virtual Machine ("JVM") if execution of Java® code is necessary.

System 100 may run one or more VMs (e.g., guest 122), by executing a software layer (e.g., hypervisor 120) above the hardware and below the guest 122, as schematically shown in FIG. 1. In an example, the hypervisor 120 may be a component of respective host operating system 118 executed on host 110. In another example, the hypervisor 120 may be provided by an application running on host operating system 118. In an example, hypervisor 120 may run directly on host 110 without an operating system beneath hypervisor 120. Hypervisor 120 may virtualize the physical layer, including processors, memory, and I/O devices, and present this virtualization to guest 122 as devices, including virtual central processing units, virtual memory devices, virtual input/output devices, and/or guest memory 195A. In an example, guest 124 may be a similar guest to guest 122, hosting a second copy of application 160A (e.g., application 160B).

Guests 122 and 124 may run on any type of dependent, independent, compatible, and/or incompatible applications on the underlying hardware and host operating system 118. In an example, a container or application (e.g., applications 160A-B) running on guests 122 and 124 may be dependent on the underlying hardware and/or host operating system 118. In another example, a container or application (e.g., applications 160A-B) running on guests 122 and 124 may be independent of the underlying hardware and/or host operating system 118. In an example, a container or application (e.g., applications 160A-B) running on guests 122 and 124 may be compatible with the underlying hardware and/or host operating system 118. Additionally, a container or application (e.g., applications 160A-B) running on guests 122 and 124 may be incompatible with the underlying hardware and/or OS. The hypervisor 120 may manage memory for the host operating system 118 as well as memory allocated to the guests 122 and 124 and guest operating system 196A-B such as guest memory 195A-B provided to guest OSes 196A-B. In an example, any form of suitable network for enabling communications between computing devices, for example, a public network (e.g., the Internet), a private network (e.g., a local area network (LAN) or wide area network (WAN)), or a combination thereof may be employed to connect host 110, guests 122 and 124, and/or to other computer systems.

In an example, hypervisor 120 allocates respective sections of host memory in memory device 114 as dedicated device memory for guest memory devices (e.g., guest memories 195A and 195B). In an example, guest OS 196A and applications executing on guest 122 (e.g., application 160A) access guest memory 195A via storage controller 140. In an example, guest OS 196B and applications executing on guest 124 (e.g., application 160B) access guest memory 195B via storage controller 150, which is a component part of memory device driver 156 associated with guest memory 195B. In an example, guest memories 195A-B are virtual memory devices implemented on guests 122 and 124 respectively. In the example, these virtual memory devices are configured to provide access for guests 122 and 124 to data in memory device 114 of host 110 and/or to each other's memory spaces. In an example, the device memory allocated to guest memories 195A by hypervisor 120 is also virtualized to allow guest 122 to access those memory addresses. In an example, filesystem queues (e.g., FS queues 142, 144 and FS queues 152, 154) are added to the device memory. In an example, FS queues 142 and 144, being stored in device memory for the guest memory device of guest memory 195A, are accessible to both the guest 122 as well as hypervisor 120, including by a filesystem daemon (e.g., FS daemon 130). Therefore FS queues 142 and 144 provide a communication channel between guest 122 and FS daemon 130. FS queues 152 and 154 similarly provide a communication channel between guest 124 and FS daemon 130. In an example, guest 124 is implemented with a separate FS daemon 132. In some examples, one FS daemon on hypervisor 120 may be configured to handle filesystem requests for multiple guests.

In typical computer systems, there may be more data referenced by executing applications (both applications executing on physical hardware and those in virtualized guests on the physical hardware) than the amount of random access memory available on the system. Typically, memory virtualization is implemented to allow memory to be shared among these various processes. For example, data may be loaded to memory when it is needed for a program to execute, and then moved to slower storage such as hard disk when the data is not being accessed. In an example, memory paging is implemented to track the virtual addresses of the data of executing applications. A given memory address may be referenced by any number of virtual addresses. Page tables that perform lookups to translate between virtual and physical memory addresses may be implemented with granular access controls, such that a given execution context (e.g., guest user, guest kernel, host user, host kernel) may access only those memory locations that it has permission to access. In an example, page tables 148 and 158 provide translation of virtualized guest memory addresses (e.g., between guest virtual addresses ("GVA") and guest physical addresses ("GPA")), while hypervisor page table 137 provides translation between GPAs or host virtual addresses ("HVA") and host physical addresses ("HPA"). In some systems an extra layer of translation may be implemented between GPAs and HVAs.

In an example, file operation requests (e.g., OPEN, READ, DELETE, CLOSE, RELEASE, WRITE, COMMIT, UPDATE, etc.) from an application 160A executing in guest 122's user space (e.g., an unprivileged application) may be sent to guest OS 196A (e.g., guest 122's privileged kernel). Guest OS 196A forwards the file operation to storage controller 140 in guest 122 associated with guest memory 195A (e.g., a virtual storage device), which converts the request into a format compatible with FS daemon 130 in hypervisor 120. This converted request is then sent to FS daemon 130 via FS queue 142. FS daemon 130 requests hypervisor 120 to translate the file request to a host memory address of the file being requested (e.g., via hypervisor page table 137). Access permissions to the requested file stored in memory device 114 may be validated by guest OS 196A, storage controller 140, FS daemon 130, and/or hypervisor 120. Upon identifying the host memory address of the file, this host memory address may be mapped to a GPA by the hypervisor 120 (e.g., by FS daemon 130) in hypervisor page table 137. In an example, where the file is stored in a persistent storage device but is not currently stored in random access memory, the host memory address may be a host memory address allocated to store the file in random access memory in response to a page fault generated from an attempt to retrieve the file's contents (e.g., by guest 122). This GPA may then be mapped to a GVA in page table 148 allowing guest 122 to access the file in memory device 114 by accessing the GVA in page table 148. In an example, additional file operations (e.g., committing changes to persistent memory via msync( ) transferring buffered updates data to HDD/SSD via fsync( )) made to the file may also be passed through FS queue 142 and/or FS queue 144.

System 100 as illustrated in FIG. 1 provides for access to host memory (e.g., memory device 114) for guests 122 and 124 while limiting security risks by passing memory access requests and commands through an indirect channel implemented by combining virtualized networking protocols with a virtualized filesystem. In an example, guest 122 may be configured to access persistent storage devices (e.g., memory device 114) by mounting a filesystem (e.g., filesystem of guest memory 195A) associated with a storage volume on the storage device. In the example, a paravirtualized storage device (e.g., guest memory 195A/B) may be implemented in guest 122 or 124, where the paravirtualized device (or its driver (e.g., memory device driver 151)) is aware that it is a virtual device. In the example, communications between the paravirtualized virtual device (e.g., guest memory 195A) and hypervisor 120 may be established via queues (e.g., FS Queues 142 and 144) implemented in device memory allocated to the virtual device, where the queues are accessible to both the guest (e.g., via the virtual device's driver) and also to the hypervisor. These queues may be configured to pass software commands and data rather than hardware commands, since both the paravirtualized virtual device and the hypervisor are aware that the virtual device is virtualized.

A virtual filesystem implementation may be combined with a paravirtualized virtual storage device to effectively and securely provide access to files stored on another system (e.g., a separate guest, a host of a guest). By moving the filesystem daemon for a virtual filesystem implementation such as FUSE to the hypervisor controlling memory access for a guest, the filesystem daemon (e.g., FS daemon 130 or 132), instead of being restricted to accessing storage devices available to the guest (e.g., guest 122 or 124), is instead granted access to any storage device (e.g., memory device 114), whether virtual or physical, available to the hypervisor. In an example, a virtual storage device on a guest includes a storage controller (e.g., FUSE client/driver) that reinterprets file requests made by a guest user to the guest kernel into a virtual filesystem request ("VFS request") (e.g., FUSE request). This VFS request is sent to a filesystem daemon ("FS daemon") on the host of the guest (e.g., in the hypervisor) via a virtual I/O protocol (e.g., Virtio). For example, FUSE requests may be packaged into Virtio messages placed in Virtio queues (e.g., FS queues 142, 144, 152, 154) shared by the storage controller 140 or 150 and FS daemon 130 or 132. FS daemon 130 or 132 may then be configured to interact with the host kernel, which performs memory address translation to locate and retrieve the data sought via the file request made by the guest user. The hypervisor 120 (in conjunction with the guest kernel) provides security controls via access permissions to the requested data. Upon the host kernel locating the data and the hypervisor validating access rights, the data may be repackaged by the FS daemon into a message for the virtual I/O protocol (e.g., a Virtio message in a Virtio queue) returning the data to the virtual storage device and the guest kernel, which may then provide access to the retrieved copy of the data to the guest user requesting the data. Access may be similarly requested for data belonging to other guests, since the FS daemon would have access to the data of each guest executing on the host. Efficiency is achieved because paravirtualization protocols such as Virtio are well optimized for guest to host communications, while data security against malicious intrusion is maintained so long as the hypervisor or host kernel hosting the FS daemon can be trusted.

In some examples, passing data through virtual I/O protocols, while relatively secure, may incur unnecessary and/or unwanted file access latency. In an example, data access latency may be reduced and storage efficiency may be increased in such implementations by allowing guests to directly access files in host memory identified using the paravirtualization protocol after access permissions have been validated. For example, multiple file copying steps may be eliminated by giving a guest kernel and/or an application on a guest access to the copy of a file in a host directly. For example, transferring a file via virtual I/O protocol may entail multiple file copies (e.g., host memory to cache for packaging by the FS daemon, cache to filesystem queue to transmit to the guest, queue to guest kernel to remove the message from queue, and guest kernel into application cache for an application to manipulate). Direct access may reduce the required number of copies to two (e.g., the copy in host memory and a copy in cache being manipulated), and one of those copies (e.g., the cached copy) may be implemented with copy on write to further reduce memory capacity consumption. In such examples, using the paravirtualization protocol for file operational commands while allowing file content manipulations to occur through directly mapping host memory addresses into a guest's memory address space may provide a more optimal balance between access control, data security, and performance. For example, allowing direct access to host memory theoretically weakens the separation between guest and host. However, by enforcing that file operational commands (e.g., OPEN, READ, DELETE, CLOSE, RELEASE, WRITE, COMMIT, UPDATE, etc.), including commands to commit changes and retrieve files, are routed through the paravirtualization protocol, an additional level of security may be applied at the filesystem daemon level to prevent unauthorized file access or modification. Therefore, the presently disclosed systems and methods of direct access to host memory by guests allows for sharing data between a guest, its host, and other guests on the host, that is faster and more efficient while being at least similarly secure as compared with other data sharing techniques.

Other existing shared filesystem protocols such as NFS and 9PFS may also be extended to provide similar inter-system memory access to the proposed combination of extensions to Virtio and Fuse. Some of these implementations (e.g., NFS, 9PFS) may lack full POSIX compatibility, and therefore require applications to be developed with these protocols in mind, which significantly restricts backwards compatibility and inter-platform compatibility. Some of the flexibility in scalability offered by virtualization would therefore be limited. However, the example protocols (e.g., Virtio and Fuse), which are provided as illustrative examples only, allow for fairly straight forward implementations of the present disclosure as they are not full network filesystems and therefore do not have to fully support file operations across a network. Any suitable paravirtualization protocol may be combined with any suitable virtual filesystem protocol to implement the methods disclosed herein and systems configured to execute such methods.

In system 100 illustrated in FIG. 1, hypervisor 120 is further configured with a registration server 134, which may be implemented with any suitable combination of hardware and software. In the example, registration server 134 is configured to track files in a shared filesystem on host 110 that are actively being accessed, and to provide version control for such files. For example, at least part of the storage of memory device 114 is accessible to host 110 and its guests 122 and 124 via a shared filesystem (e.g., a Virtio/FUSE paravirtualized filesystem). In the example, guests 122 and 124 may both be configured with read/write access to the same file. Registration server 134 is configured to create an entry in a registration table 135 stored in a memory location accessible to guests 122 and 124 that identifies a current version of the file. By implementing the registration table 135, guests 122 and 124, rather than performing metadata operations purely through storage controller 140 or 150 and corresponding FS daemons 130 and 132, may instead identify whether a locally cached copy of the metadata for the file in metadata cache 146 or 156 is up to date, and therefore usable to respond to a metadata request. This allows metadata requests to be handled orders of magnitude faster than relying on communications via FS queues 142, 144, 152, or 154. For example, 100 ns-200 ns to verify that cached metadata is current and then to query the cached metadata vs. 1,000 ns-10,000 ns to send a request via FS queue, then 100 ns-200 ns for the FS daemon 130 or 132 to handle the request, followed by another 1,000 ns-10,000 ns for the FS daemon to return results to the storage controller 140 or 150. However, communications via FS queue would still be orders of magnitude faster than communicating over a networking protocol, which would typically take on the order of 1 ms to 100 ms. In many cases, repeatedly accessed entries in registration table 135 may be maintained in processor caches of CPU 112 instead of in main random access memory, which may result in even faster (e.g., 10-50 ns) validation of whether cached metadata is stale.

Figure 2:
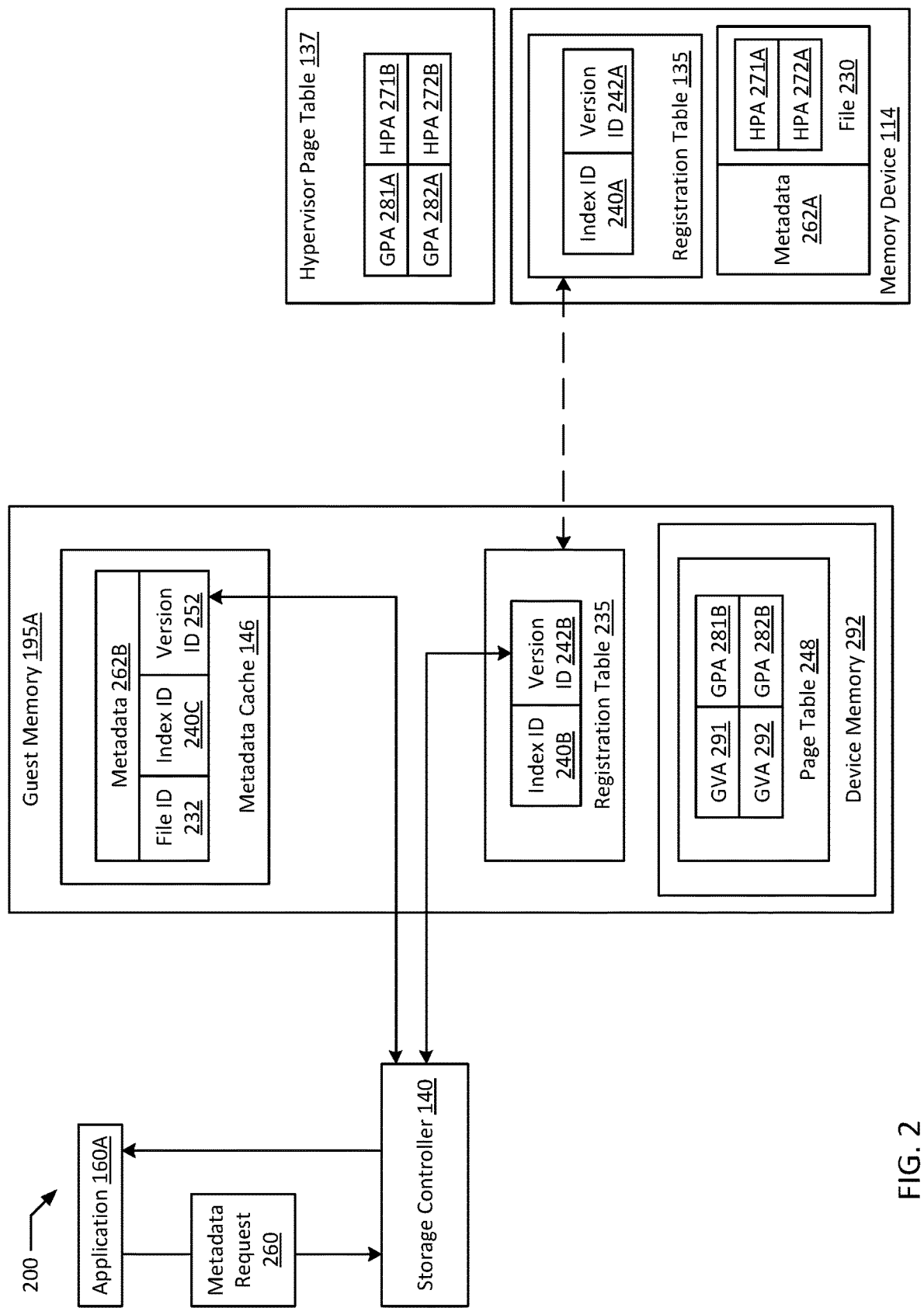
FIG. 2 is a block diagram illustrating responding to a metadata request with metadata cached in a metadata cache according to an example of the present disclosure.

FIG. 2 is a block diagram illustrating responding to a metadata request with metadata cached in a metadata cache according to an example of the present disclosure. In system 200 depicted in FIG. 2, application 160A requests information related to file 230 stored in memory device 114 that may be responded to via metadata operations (e.g., via metadata request 260). In an example, metadata request 260 may include a request to retrieve information about file 230 (e.g., user ID of who owns it, permissions, file type (special, regular, named pipe, etc.), which disk-blocks the file uses, links to the file, etc.). In an example, file 230 may be associated with a metadata index entry (e.g., an inode) storing the metadata information related to file 230.

In an example, prior to requesting metadata request 260, application 160A has already requested access to file 230 and file 230 is already mapped to a memory space of application 160A. In an example a virtual storage device associated with guest memory 195A may be initialized by hypervisor 120 receiving a request to initialize a guest memory device in a guest 122. In the example, the guest memory device (e.g., a virtual device hosting guest memory 195A) is configured to provide access to files in a host memory (e.g., memory device 114) to guest 122. In an example, a request to mount a virtual file system associated with memory device 114 to guest 122 may be received by hypervisor 120. In an example, requested guest memory 195A may be configured to appear to application 160A as storage provided by a PCI device. The hypervisor 120 allocates device memory 292 associated with the guest memory device. In an example, hypervisor 120 reserves a section in host memory (e.g., memory device 114) as device memory 292 associated with a guest memory device that will be mounted to guest 122 provide storage as guest memory 195A to guest 122. In the example, the device memory 292 is reserved for virtual device usage, for example, for communications queues (e.g., FS queues 142 and 144, and page table 248) which will allow a storage controller (e.g., storage controller 140) of the new guest memory device to communicate with FS daemon 130 in hypervisor 120.

The hypervisor 120 creates a first plurality of queues (e.g., represented by FS queue 142) and a different second plurality of queues (e.g., represented by FS queue 144) in the device memory 292A. In an example, a filesystem daemon (e.g., FS daemon 130) of the hypervisor 120 is configured to receive messages from both the first plurality of queues (e.g., low priority queues, represented by FS queue 142) and the second plurality of queues (e.g., high priority queues, represented by FS 144). In an example, low priority queues (e.g., FS queue 142) handle file content requests, through which the contents of a file are retrieved for processing, while high priority queues (e.g., FS queue 144) handle file operations requests (e.g., rename, move, delete a file, cancel a previous request, etc.) and/or metadata requests (e.g., requests fulfilled via metadata queries for directory listings, modification times, file existence, etc.) which do not require access to file contents. In an example, a later received file operations request or metadata request may be processed by FS daemon 130 before an earlier received file content request completes processing. In an example, FS daemon 130 and storage controller 140 are configured to receive messages placed in the FS queues 142 and 144 in device memory 292A, and also configured to be permitted to place messages into these queues. In an example, storage controller 140 executes in a kernel of guest 122 (e.g., guest OS 196A). In an example, storage controller may execute as a component of the virtualized guest memory device hosting guest memory 195A, or as a component of a driver of the virtualized guest memory device executing in guest OS 196A.

In an example, after access to memory device 114 is established via guest memory 195A, application 160A requests access to file 230 stored in memory device 114, and storage controller 140 executes in conjunction with FS daemon 130 to locate file 230 for retrieval. In an example, application 160A first sends a file request to storage controller 140 (e.g., open file/etc/host.conf) to retrieve a networking configuration file associated with host 110. Guest OS 196A determines that the/etc directory is located in a filesystem mounted as guest memory 195A, and that access to guest memory 195A is provided via storage controller 140. In an example, storage controller 140 is a component of a virtual storage device providing a storage volume accessible to guest 122 (e.g., guest memory 195A). In another example, storage controller 140 is a component of a driver for the virtual storage device executing in guest OS 196A. Guest memory 195A may be implemented with a reserved device memory 292 in which a plurality of filesystem queues (e.g., FS queues 142, 144) and page tables (e.g., page table 248) are stored. In an example, storage controller 140 takes the file request sent from application 160A to guest OS 196A, and translates the request. In an example, the translated file request includes several parameters related to file 230. For example, the translated file request may include a file handle to identify file 230, an offset within file 230 locating the portion of file 230 guest 122 intends to retrieve, and/or an identifier for a range of available guest virtual memory addresses where file 230 may be mapped to allow guest 122 to access file 230. For example, translation may include packing the request into a message envelope compatible with FS queue 142 (e.g., a Virtio message). In addition, translation may include converting the file request received by guest OS 196A into a filesystem request format accepted by FS daemon 130 (e.g., a FUSE_OPEN or FUSE_OPENDIR request). For example, a file OPEN request may be translated to a FUSE_OPEN or FUSE_OPENDIR request, a file READ request may be translated to a FUSE_READ or FUSE_READDIR request, etc. In an example, adding a the translated file request to FS queue 142 may include additional translation, for example, packaging the translated file request into a message envelope format acceptable to the transport protocol implemented for FS queue 142 (e.g., a Virtio message). In an example, multiple pluralities of queues may be implemented for message transport between storage controller 140 and FS daemon 130. For example, low priority queues (e.g., FS queue 142) may be implemented to handle file content requests (e.g., FUSE_READ, FUSE_WRITE, etc.), while high priority queues (e.g., FS queue 144) may be implemented to handle instructional requests (e.g., FUSE_INTERRUPT, etc.) and/or metadata requests (FUSE_GETATTR, FUSE_LOOKUP, etc.). For example, an interrupt command may be sent on FS queue 144 to stop a file content retrieval request sent via FS queue 142. In an example, storage controller 140 may be configured to perform translation similarly to a typical FUSE implementation where the FUSE daemon would be located in the userspace of guest 122, but the translation output may be redirected to FS daemon 130 in hypervisor 120 via FS queue 142. In an example, FS daemon 130 is configured to retrieve messages from FS queues 142 and 144. For example, FS daemon 130 may subscribe to alerts of memory modifications in the memory addresses associated with FS queues 142 and 144 generated by hypervisor 120 and/or host OS 118. In an example, upon receiving a request for file 230, FS daemon 130 removes any transmission protocol related wrapper (e.g., Virtio wrapper) on the packaged filesystem request to receive the filesystem request.

Typically, in UNIX® operating systems and their derivatives (e.g., Red Hat Enterprise Linux®, AIX®, Solaris®, etc.) everything that the operating system interacts with is defined as a type of file, including I/O devices and storage devices. I/O devices are typically exposed as character devices, which when read, display a continuous stream of characters. For example, a keyboard character device would display the characters typed on the keyboard. Buffering may be implemented to display whole messages rather than a stream of characters (e.g., for a network device that assembles multiple packets into one message). Block devices are typically storage devices that retrieve entire blocks or pages of data from a storage device at once. In a character device, data would be read as it is sent to the device (e.g., a second message may be interjected into the middle of a larger first message as an interrupting communication). In an example, communication between storage controller 140 and FS daemon 130 is routed through FS queues 142 and 144 rather than directly through a device file (e.g., a character or block device) as would be the case where FS daemon 130 were executing within guest 122. In such an example, because data in FS queues 142 and 144 are read sequentially as whole messages, a message that takes a long time to compose may block subsequent messages from appearing on the queue. Therefore a high priority request from storage controller 140 to FS daemon 130 that is intended to interrupt a low priority request or to be executed before or in parallel to the low priority request cannot be sent via the same communication channel as a the low priority request. This means that, if the same communication channel were used (e.g., FS queue 142) an interrupting high priority request would not be received until the low priority request submitted to the queue before the high priority request finishes transmitting. Therefore a second queue (e.g., FS queue 144) may be implemented to support high priority requests. For example, if a file retrieval request is sent on FS queue 142, followed by a subsequent file retrieval request also to FS queue 142, sending a cancellation request to cancel the first file retrieval request on FS queue 142 while the FS daemon 130 is executing the first file retrieval request may be useless because the cancellation request would not be processed until after the second file retrieval request. In an example, a processing efficiency optimization may include rerouting file requests that can be handled by metadata operations (e.g., without retrieving the contents of a file) to high priority queues so that requests to locate a file, acquire a lock on a file, or retrieve information such as modification time do not have to wait for an ongoing file content retrieval request to finish executing. In addition, interrupting commands (e.g., to cancel or terminate file access) may also be routed to higher priority queues.

In an example, FS daemon 130 then converts the request into a memory access request to hypervisor 120. For example, hypervisor 120 may be a virtual machine monitor (e.g., Quick Emulator ("QEMU")) that performs memory lookup, address translation, and address mapping to provide access to files in host memory. In the example, FS daemon 130 requests the file requested by application 160A (e.g., the host.conf configuration file) from hypervisor 120. In the example, hypervisor 120 locates file 230 in memory device 114 via page table lookup in hypervisor page table 137. In the example, file 230 is determined to be located at HPAs 271A and 272A, represented in hypervisor page table 137 as corresponding HPAs 271B and 272B. The hypervisor 120 validates application 160A, guest OS 196A, and/or FS daemon 130's access permissions to the HPAs 271B and/or 272B. In an example, file 230 may reside in persistent storage (e.g., HDD, SSD) but not in random access memory. In such an example, file 230 may be associated with one or more host virtual addresses, but not necessarily a host physical address. In such an example, when FS daemon 130 requests that file 230 be mapped to guest memory 195A, hypervisor 120 may map the host virtual address(es) of file 230 to guest physical addresses of guest 122 (e.g., GPA 281A, 282A), which may in turn be mapped to GVA 291 and/or 292 in page table 248. In the example, when guest 122 attempts to access GVA 291, a page fault is triggered because file 230 does not reside in random access memory and is not yet associated with a host physical address. Host 110 (e.g., host OS 118, hypervisor 120) then handles the page fault by allocating HPAs 271A and/or 272A to file 230, retrieves file 230 from persistent storage, and loads file 230 into HPAs 271A and/or 272A. In the example, with the page fault resolved, guest 122 accesses file 230 directly via HPAs 271A and/or 272A.

In various examples, multiple layers of file access control may be implemented. For example, guest OS 196A may first validate that application 160A has access to the requested file (e.g., the/etc/host.conf configuration file). In an example, after such validation, storage controller 140 may send a filesystem request to FS daemon 130 with the credentials of guest OS 196A (e.g., the guest kernel). FS daemon 130 may then validate that guest OS 196A has access to the files represented in the filesystem of guest memory 195A, including the/etc/host.conf executable. Hypervisor 120 may then validate that FS daemon 130, and/or guest OS 196A has access to the HPAs 271B and/or 272B of the file 230 in memory device 114. In an example, when guest 122 attempts to open file 230, or when FS daemon 130 requests for file 230 to be mapped to guest 122's address space, hypervisor 120 and/or host OS 118 determines whether or not FS daemon 130 has sufficient rights to open file 230. In an example, host OS 118 may additionally determine whether or not hypervisor 120 is permitted to map HPAs 271A and/or 271B to the guest address space of guest 122. In an example, storage controller 140, FS daemon 130, and/or hypervisor 120 may reject a file request based on access permissions associated with a file being retrieved. In an example, rejection of a file request may include logging the attempted file request and/or generating an error message related to the rejected file request. In an example, filesystem daemon 130 and/or hypervisor 120 rejects a different file retrieval request to access a different file based on access permissions associated with the different file.

In an example, hypervisor 120 (e.g., via FS daemon 130) provides access to file 230 to guest 122 by mapping file HPAs 271B and/or 272B to corresponding GPAs 281A and/or 282A in hypervisor page table 137. These GPAs 281A and/or 282A are then mapped to corresponding GVAs 291 and/or 292 in page table 248 in device memory 292A associated with the guest memory device of guest memory 195A. In an example, FS daemon 130 provides notice of the mapping of GPAs 281A/282A and/or GVAs 291/292 to storage controller 140 (e.g., via FS queues 142 and/or 144). In an example, storage controller 140 then provides access to file 230 to application 160A via GVA 291 and/or 292. In an example, application 160A only requests access to a segment of file 230, in which case only a segment of file 230 (e.g., corresponding to HPA 272A, GPA 282A, and GVA 292) is provided to application 160A. In an example, guest OS 196A may further map GPAs 281B and/or 282B, or GVAs 291-292 to a memory address space of application 160A (e.g., via an additional page table and additional GVAs). In an example, a copy of file 230 may be cached by guest OS 196A for manipulation by application 160A. In an example this copy of file 230 may be a full copy or a copy on write copy.

In an example, FS daemon 130 is configured to notify registration server 134 (or registration server 134 is configured to detect) that access to file 230 has been requested. In an example, registration server 135 determines that there is no entry in registration table 134 associated with file 230 (e.g., due to guest 122 being the first guest to request access after file 230 was previously closed). In the example, registration server 134 creates an entry in registration table 135, which is directly accessible to guest 122 and storage controller 140 as registration table 235 in guest memory 195A, that corresponds to file 230 (e.g., an entry identified by index ID 240A). In the example, this entry identified by index ID 240A is set to an initial version ID 242A (e.g., 0). In an example, registration table 135 is configured to be read only by guests 122 and 124, but read/write by hypervisor 120 (including registration server 134 and FS daemons 130 and 132). In an example, the functionality of registration server 134 may be incorporated into FS daemon 130 and/or 132.

In an example, after access to memory device 114 is established via guest memory 195A and storage controller 140, storage controller 140 may be further configured to cache all or part of the metadata of the files accessible via the virtual filesystem in a metadata cache 146. In an example, metadata 262A is metadata associated with file 230 (e.g., stored in an inode). In the example, storage controller 140 caches a copy of metadata 262A (e.g., the initial version of metadata 230) as metadata 262B in metadata cache 146. In the example, metadata 262B is identified by a file ID 232 (e.g., file handle, file descriptor, etc.) and an index ID 240C (e.g., a copy of index ID 240A). In an example, storage controller 140 additionally caches the then current value of version ID 242A (e.g., 0) as version ID 252 associated with metadata 262B, file ID 232, and index ID 240C. In an example, when storage controller 140 later receives metadata request 260, storage controller 140 retrieves version ID 252 based on file ID 232 (e.g., included in metadata request 260), along with version ID 242B (e.g., based on index ID 240B matching index ID 240C). Upon determining that version ID 242B matches version ID 252, storage controller 140 determines that metadata 262B is still current and therefore storage controller 140 responds to metadata request 260 based on information stored in metadata 262B.

Figure 3A:
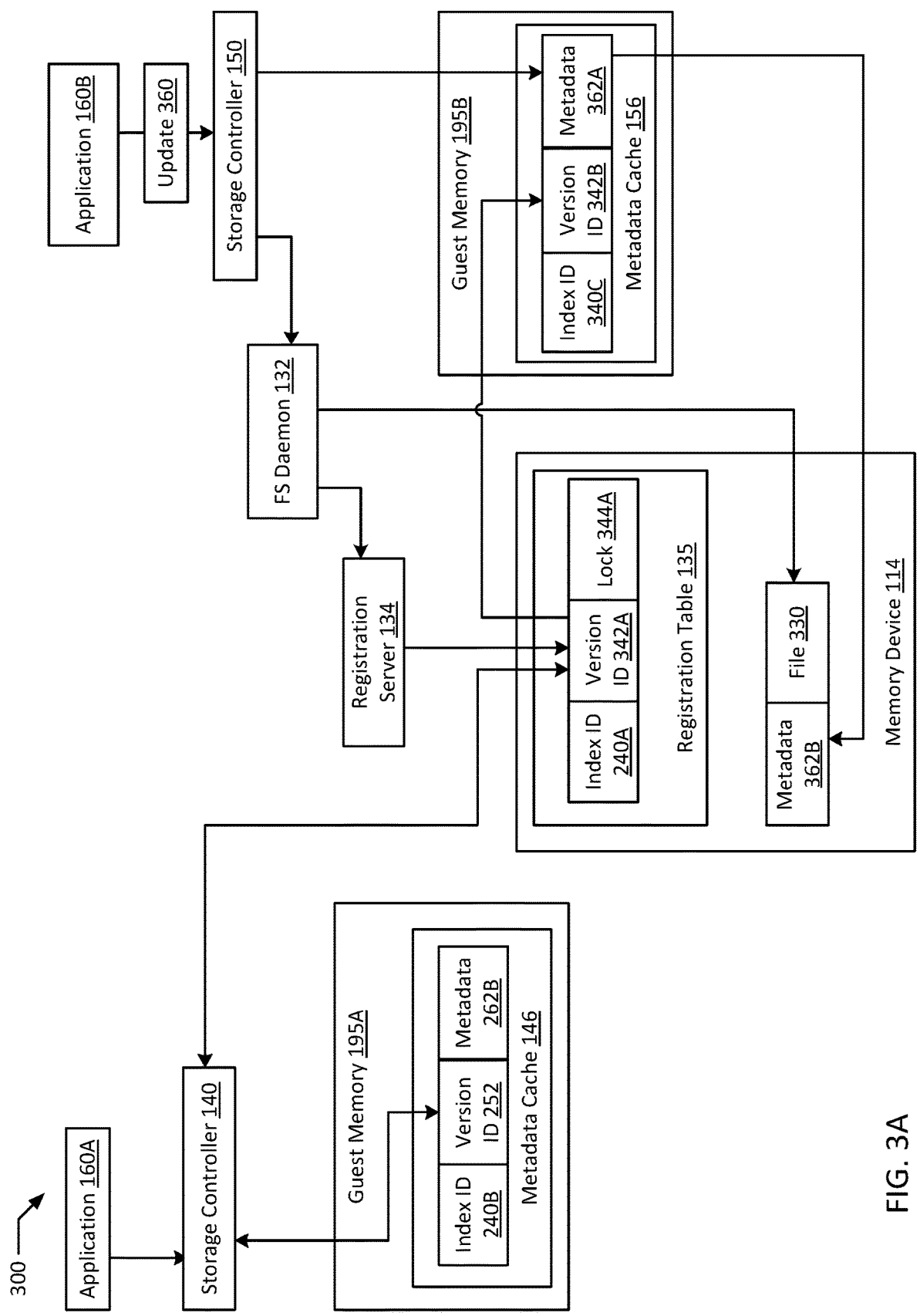
FIGS. 3A-B are block diagrams illustrating detecting that metadata in a metadata cache is stale and updating said metadata according to an example of the present disclosure.
Figure 3B:
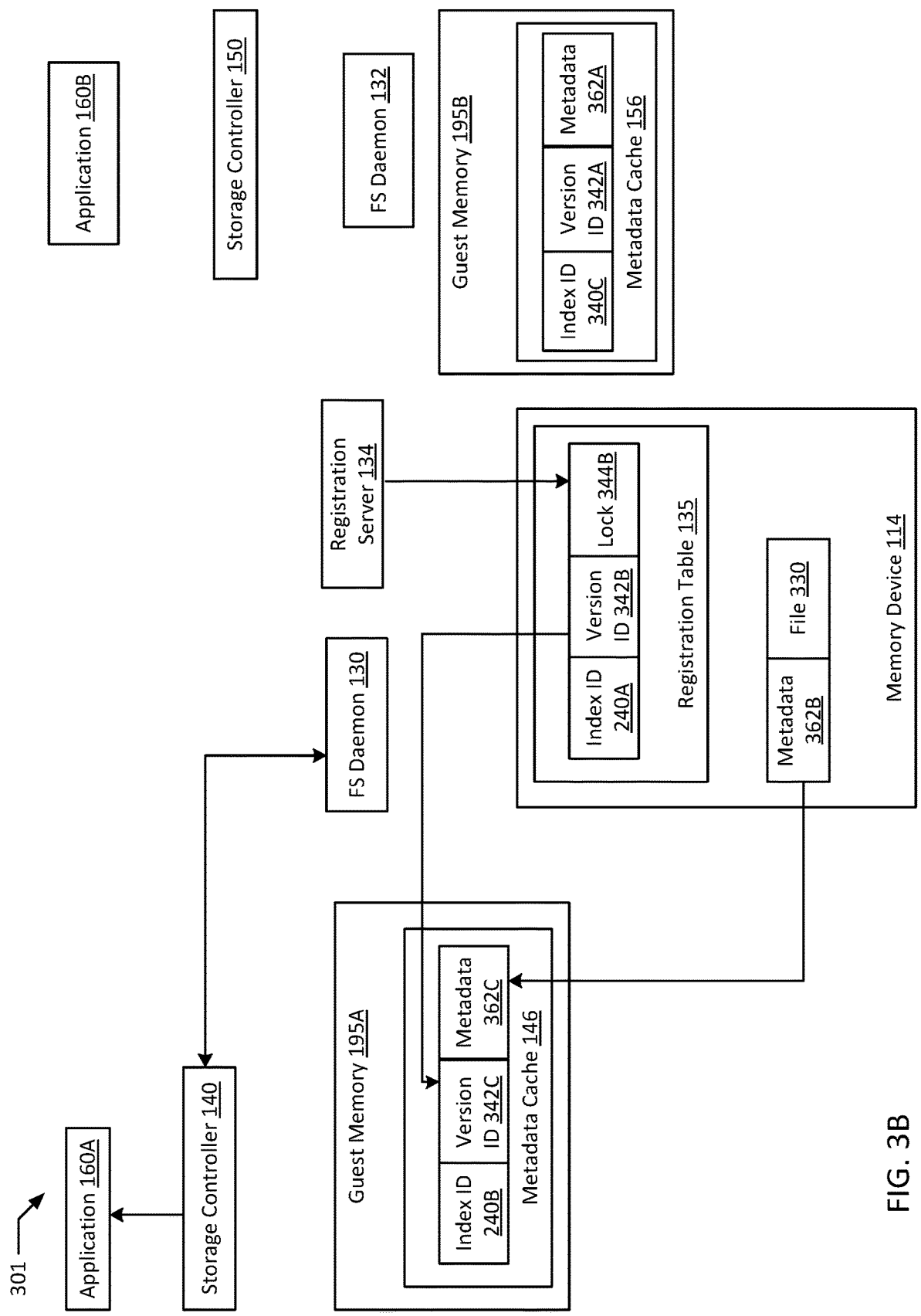

FIGS. 3A-B are block diagrams illustrating detecting that metadata in a metadata cache is stale and updating said metadata according to an example of the present disclosure. In an example, system 300 as illustrated by FIG. 3A is a later execution state of system 200, where guest 124 has also requested and been granted access to file 230 (e.g., via guest memory 195B, storage controller 150, and FS daemon 132). In the example, access to file 230 (e.g., /etc/host.conf) is therefore now shared by both guests 122 and 124 on which two copies of a network connected application (e.g., applications 160A-B) execute. In an example, both applications 160A and 160B are actively accessing file 230. In an example, application 160B modifies file 230 with update 360, for example, made to a section of file 230 stored in HPA 271A. In an example, to commit update 360 to memory device 114, application 160B sends a COMMIT command to guest OS 196B, which sends the command to storage controller 150. In the example, storage controller 150 translates the COMMIT request to a FUSE request sent to FS daemon 132 via FS queue 154 (e.g., a high priority queue). FS daemon 132 then executes a memory synchronization command (e.g., msync( ) fsync( )) to commit the changes to file 230. For example, msync( ) may cause data updates associated with HPA 271A to be flushed from CPU caches on host 110, and then a fence operation to commit update 360 (including corresponding metadata updates) to memory device 114. In an example, while a flush and/or fence operation is being executed, changes to file 230 and HPAs 271A and 272A are restricted (e.g., application 160A may not simultaneously modify file 230). A flush operation forces any pending changes to file 230 out of CPU 112 prior to committing the changes in memory device 114. In an example, after being updated, file 230 becomes file 330, and metadata 262A becomes metadata 362B.

In an example, in processing update 360, storage controller 150 may additionally update cached metadata for file 230 (e.g., updating the metadata to become metadata 362A). In the example, index IDs 240A-B and 340C all refer to a metadata index entry of file 230. In an example, when storage controller 150 requests FS daemon 132 to update file 230, FS daemon 132 (either directly or via registration server 134) updates version ID 242A to version ID 342A (e.g., by incrementing 0 to 1). In the example, this updated version ID is copied to metadata cache 156 as version ID 342B. In an example, storage controller 150 and/or FS daemon 132 may additionally request a change lock on file 230 while updates are being made (e.g., lock 344A). In an example, lock 344A may be a Boolean flag (e.g., true or false, 0 or 1) associated with index ID 240A in registration table 135. This flag may be set to true when a request to update is received and reset to false after an update is committed or cancelled. In another example, lock 344A may be implemented in conjunction with version ID 342A. For example, a lock may be set for a configured duration automatically when version ID 342A is updated (e.g., via a timer, timeout, etc.). In an example, a competing request to update file 230 (e.g., from application 160A) received while lock 344A is set will be rejected (e.g., by FS daemon 130). In an example, when storage controller 140 and/or 150 is instructed to make a file update (e.g., to file 230), the storage controller first validates its cached version ID (e.g., version ID 252) against the then current version ID in registration table 135 (e.g., 342A). In an example, storage controller 140 and/or 150 is configured to verify whether lock 344A is set prior to making an update, and may generate an error in response to a requested update while lock 344A is set.

In an example, as a result of handling update 360, registration server 134 and/or FS daemon 132 updates version ID 342A in registration table 135 to version ID 342A. In the example, version ID 342A is copied to metadata cache 156 (e.g., by storage controller 150 or hypervisor 120). In the example, storage controller 150 makes updates to metadata 362A and a locally cached copy of file 230. The updated copy of file 230 is committed to memory device 114 via FS daemon 132 as file 330. The updated metadata 362A is copied to overwrite metadata 262A in memory device 114 as metadata 362B. In an example, the copy of metadata in memory device 114 may be updated first and then the updated metadata may be retrieved to metadata cache 156 instead. In an example, lock 344A, if configured, may be released after these updates are complete. In an example, locking access may be unnecessary in many situations because it is exceedingly unlikely for two update requests to be received at the exact same time, and therefore updates may be configured to be processed sequentially. For example, rather than locking updates to file 230, if application 160A requests an update to file 230 substantially simultaneously to application 160B, but slightly afterwards, the update from application 160A would overwrite the update from application 160B. For example, when a write is committed, additional changes to the memory locations being written to may be restricted while CPU caches are flushed to capture all changes to the memory locations. In such an example, a competing change, for example, being processed on a separate CPU core would also be captured and saved overwriting the change from application 160A. In some examples, allowing uncontested overwriting of shared files may result in unexpected execution states. In such examples, a locking mechanism may enforce that a file is updated by only one process at a time, which may ensure that non-competing updates from different processes are all captured in the file. For example, application 160B may be forced to reopen the file updated by application 160A, and to append its own update without overwriting application 160A's update.

In an example, after update 360 has been successfully committed, application 160A requests storage controller 140 to check whether file 230 (e.g., a configuration file shared by applications 160A and 160B) has been updated based on a file modification timestamp stored in metadata associated with file 230. In the example, storage controller 140 determines that there is a mismatch between version ID 252 of metadata 262B and version ID 342A in registration table 135 (e.g., accessed as registration table 235). In the example, storage controller 140 therefore determines that the modification timestamp in metadata 262B cannot be relied upon (e.g., is likely stale).

In an example, system 301 as illustrated by FIG. 3B is a later execution state of system 300. In an example, storage controller 140, upon determining that metadata 262B is stale, sends a metadata request to FS daemon 130 (e.g., via high priority FS queue 144). In the example, FS daemon 130 receives the metadata request, which may have been translated into a format acceptable to FS daemon 130 by storage controller 140, by retrieving the request from FS queue 144. In an example, FS daemon 130 issues an update request for metadata cache 146 to hypervisor 120. Specifically, metadata 362B is copied to metadata cache 146 as metadata 362C (e.g., based on matching index IDs 240A and 240B). In an example, FS daemon 130 retrieves the modification time of file 330 from metadata 362B and sends the modification time to storage controller 140 via FS queue 144. In another example, FS daemon 130 notifies storage controller 140 that metadata 362C has been updated from metadata 362B, and storage controller 140 retrieves the modification timestamp from metadata 362C. In either example, version ID 342B is copied to metadata cache 146 as version ID 342C. In an example, application 160A is notified of the updated modification timestamp by storage controller 140. In the example, application 160A reconfigures itself with the updated file 330 and begins executing with the updated configuration settings in response to detecting the update. For example, application 160A may relaunch itself or request guest OS 196A to relaunch application 160A in response to the update.

Figure 4:
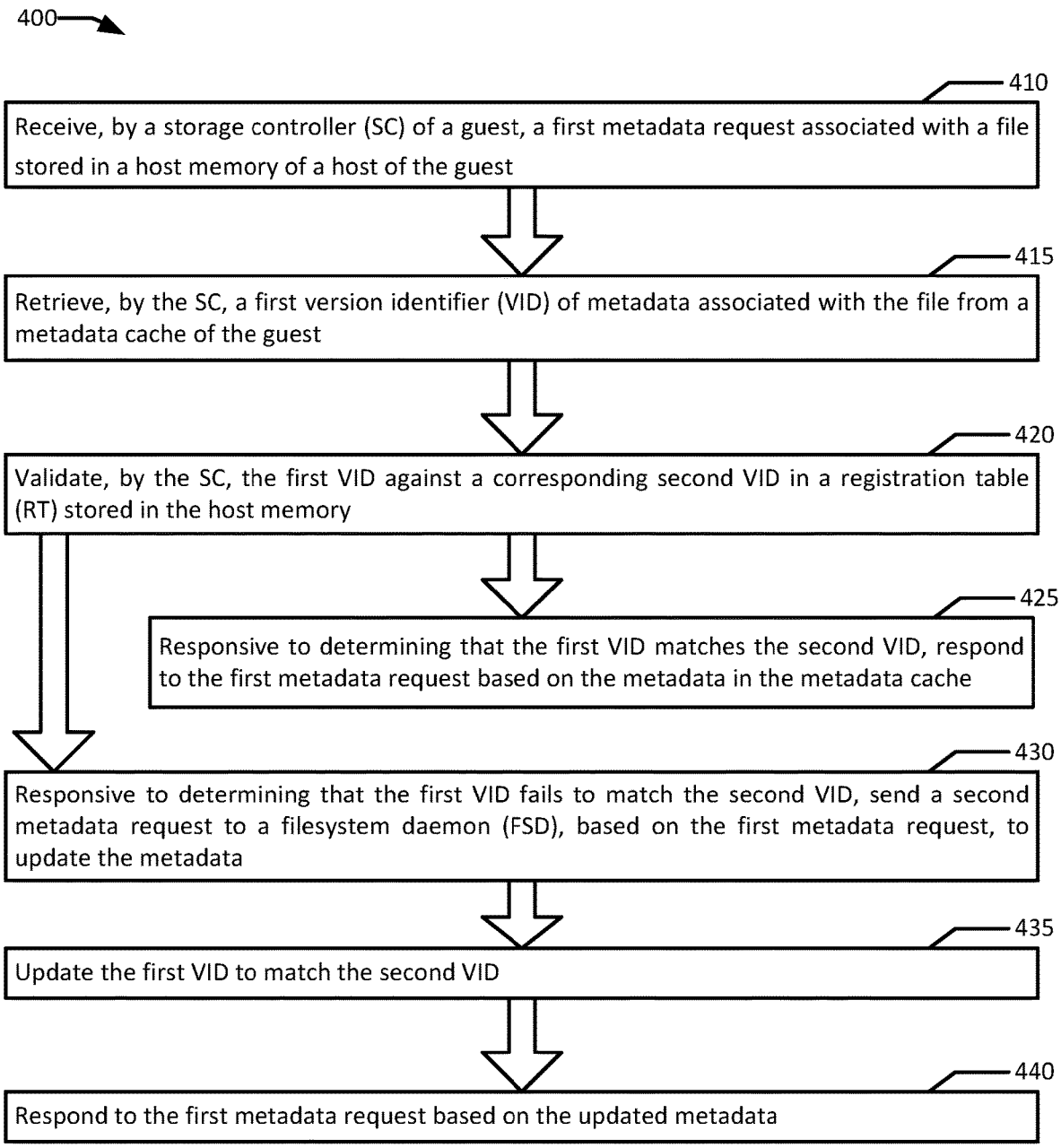
FIG. 4 is a flowchart illustrating an example of a guest handling a metadata request according to an example of the present disclosure.

FIG. 4 is a flowchart illustrating an example of a guest handling a metadata request according to an example of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method 400 is performed by a storage controller 140 and a FS daemon 130.

Example method 400 may begin with a storage controller (SC) of a guest receiving a first metadata request associated with a file stored in a host memory of a host of the guest (block 410). In an example, storage controller 140 receives metadata request 260 to perform a metadata operation (e.g., a metadata lookup, a path lookup, a directory contents lookup, a symbolic link lookup, etc.) associated with file 230. For example, application 160A request a metadata operation, and the request is assigned to storage controller 140 to handle by guest OS 196A. In an example, metadata request 260 includes a file identifier (e.g., file ID 232) that uniquely identifies file 230 in relation to the virtual filesystem of guest memory 195A. In an example, storage controller 140 is a component of a guest memory device associated with guest memory 195A. In another example, storage controller 140 is a component of a driver for the guest memory device executing on guest OS 196A. In an example, guest memory 195A is configured to provide access to files (e.g., file 230) stored in host memory (e.g., memory device 114). In an example, the mounted guest memory device associated with guest memory 195A appears to application 160A as a physical storage device, for example, a peripheral interconnect ("PCI") device. In an example, guest memory 195A is configured to provide access to files in memory device 114 by implementing a virtual filesystem that exposes a section of a filesystem associated with host OS 118 and memory device 114 to guest 122. In the example, files referenced through the virtual filesystem associated with guest memory 195A may be accessed by guest 122 via file operations directed at file identifiers (e.g., file descriptors, file handles) of these referenced files.

The SC retrieves a first version identifier (VID) of metadata associated with the file from a metadata cache of the guest (block 415). In an example, storage controller 140 retrieves version ID 252 from metadata cache 146 and version ID 242B from registration table 135 (which is mapped into guest memory 195A as registration table 235). In an example, metadata cache 146 and/or registration table 235 may be frequently accessed memory locations that are kept in random access memory and/or processor caches for rapid access. For example, access to metadata cache 146 and/or registration table 235 may be performed frequently enough that these memory locations are rarely removed from memory address translation buffers.

The SC validates the first VID against a corresponding second VID in a registration table (RT) stored in the host memory (block 420). In an example, version ID 252 is validated against version ID 242B. In an example, storage controller 140 and guest 122 are restricted to read only access to registration table 135. In the example, hypervisor 120, including registration server 135 and/or FS daemons 130 and/or 132 have read/write access to registration table 135. In an example, registration table 135 is mapped directly into a memory space of guest 122 (e.g., guest memory 195A) and a memory space of guest 124 (e.g., guest memory 195B).

In response to determining that the first VID matches the second VID, the SC responds to the first metadata request based on the metadata in the metadata cache (block 425). In an example, upon determining that version ID 252 matches version ID 242B, storage controller 140 determines that metadata 262B is not stale (e.g., no update has been made to metadata 262A of file 230). In the example, storage controller 140 may then use metadata 262B to respond to metadata request 260, which avoids requesting hypervisor 120 for access to metadata 262A (e.g., via FS daemon 130).

In response to determining that the first VID fails to match the second VID, the SC sends a second metadata request to a filesystem daemon (FSD), based on the first metadata request, to update the metadata (block 430). In an example, storage controller 140 retrieves the version ID associated with index ID 240A in registration table 135 (e.g., version ID 342A) and, upon comparing version ID 342A with version ID 252 in metadata cache 146, determines that there is a version ID mismatch. In the example, based on the mismatch, storage controller 140 determines that metadata 262B is stale and requires updating.

The first VID is updated to match the second VID (block 435). In an example, storage controller 140 updates metadata cache 146, specifically the metadata entry for cached metadata 262B associated with file 230 as identified by index ID 240B, to reflect the updated version ID (e.g., version ID 252 is updated to match version ID 342A). In an example, updating the version ID in metadata cache 146 may be performed in parallel to and asynchronously with retrieving updated metadata contents (e.g., replacing metadata 262B with metadata 362C). However, storage controller 140 needs to be configured to avoid processing a second query against the metadata entry before the contents have been updated if the version ID is updated before the contents. This is to prevent a second metadata request for the same metadata entry from using stale metadata misidentified as current based on the updated version ID.

The first metadata request is responded to based on the updated metadata (block 440). In an example, metadata request 260 is responded to with updated metadata 362C. For example, FS daemon 130 may retrieve the necessary information from metadata 362B and forward the retrieved information to storage controller 140. Alternatively, storage controller 140 may retrieve the necessary information for responding to metadata request 260 from updated metadata 362C in metadata cache 146.

In an example, after storage controller 140 responds to metadata request 260, application 160B on guest 124 requests to modify file 230. In the example, storage controller 150 sends a file update request (e.g., via FS queue 152) to FS daemon 132. In an example, FS queue 152 is inaccessible to guest 122. In an example, FS queue 152 is accessible to both guest 124 and hypervisor 120. In the example, FS daemon 132 updates version ID 242A to version ID 342A based on the update request for file 230. For example, version ID 242A is an integer value that is incremented to result in version ID 342A. In an example, FS daemon 130 also instructs host OS 118 and/or hypervisor 120 to commit changes to file 230 in relation to application 160B's update request 360. In an example, a host memory address of file 230 is mapped into the memory space of both guest 122 and 124, allowing both guests to directly access the contents of file 230. In some examples, the file request (e.g., update 360) from application 160B may additionally identify a part of a file on which the file operation is to be performed rather than a whole file, for example, via an offset value from the start of the file. In such examples, instead of a request to, for example, retrieve a whole file for access or modification, a segment of the file is identified and retrieved. For example, an offset representing the beginning of the identified segment of the file in relation to the beginning of the file is identified. This offset identifies a starting position of the requested segment, and is passed on to FS daemon 132, which includes the offset in requesting the hypervisor 120 to determine the host memory address (e.g., HPA 272A) corresponding to the start of the segment of the requested file (e.g., file 230) requested by application 160B. In such an example, rather than mapping a host memory address (e.g., HPA 271A) corresponding to the beginning of the requested file, the host memory address mapped to provide access to file 230 is adjusted with an identified memory offset (e.g., an offset from the beginning of a page or block of memory in memory device 114). This adjusted host memory address corresponding to the identified segment of file 230 may be mapped instead (e.g., HPA 272A). In an example, application 160B may request, and may be provided with, access to only part of file 230 (e.g., corresponding to HPA 272A and not HPA 272B).

In some examples, updating one file (e.g., file 230) may require multiple other related files' metadata to be updated, resulting in a cascade of metadata and version ID updates. For example, in the/etc/host.conf example, updating file 230 (e.g., /etc/host.conf) would additionally result in metadata updates to its parent directories, which may also be represented as files with associated metadata entries in metadata cache 146. For example, the/etc directory would also be updated to indicate that one of its nested files has been updated. Similarly, the /directory would require an update as well. In such an example, another file's entry in/etc (e.g., /etc/passwd) would not require a metadata update based on the change to/etc/host.conf. Therefore in an example, high level directory metadata entries may receive many more version updates than the files within those directories. However, these metadata entries, due to being accessed so often, are often cached in processor caches allowing for very fast access (e.g., 10 ns). In addition, updates to registration table entries (e.g., for version IDs) of dependent files (e.g., parent directories, symbolic links, etc.) may be performed asynchronously. For example, an FS daemon 130 may update a registration table entry for a given file 230 (including its version ID). The FS daemon 130 may then discover and update any dependent files' registration table entries as well. In an example, the FS daemon may notify the registration server 135 of the update to file 230's registration table entry, and may rely on registration server 135 to discover and update any dependent files' registration table entries.

In an example, FS daemon 130 receives a file request to access a file that is not yet accessed by any system (e.g., guest 122, guest 124, host 110) in system 100. In the example, guest 122 sends the request to FS daemon 130 via storage controller 140 and FS queue 142. In the example, FS daemon 130 instructs registration server 134 to create a new entry in registration table 135 corresponding to the newly accessed file. This new entry is then associated with a file descriptor of the new file and a version ID of the new file is set to an initial value (e.g., 0). In an example, each entry in registration table 135 includes at least a unique file identifier and a version ID. In some examples, registration table entries may additionally include a file lock flag and/or additional file or index descriptors of the file corresponding to the entry for cross reference purposes. In an example, after a given file is unmapped from all guests (e.g., guests 122 and 124) with access to the file, the corresponding registration table entry for that file is removed. In an example, when the file is next accessed, a fresh registration table entry is generated and the version ID may be reset to an initial value (e.g., 0).

Figure 5:
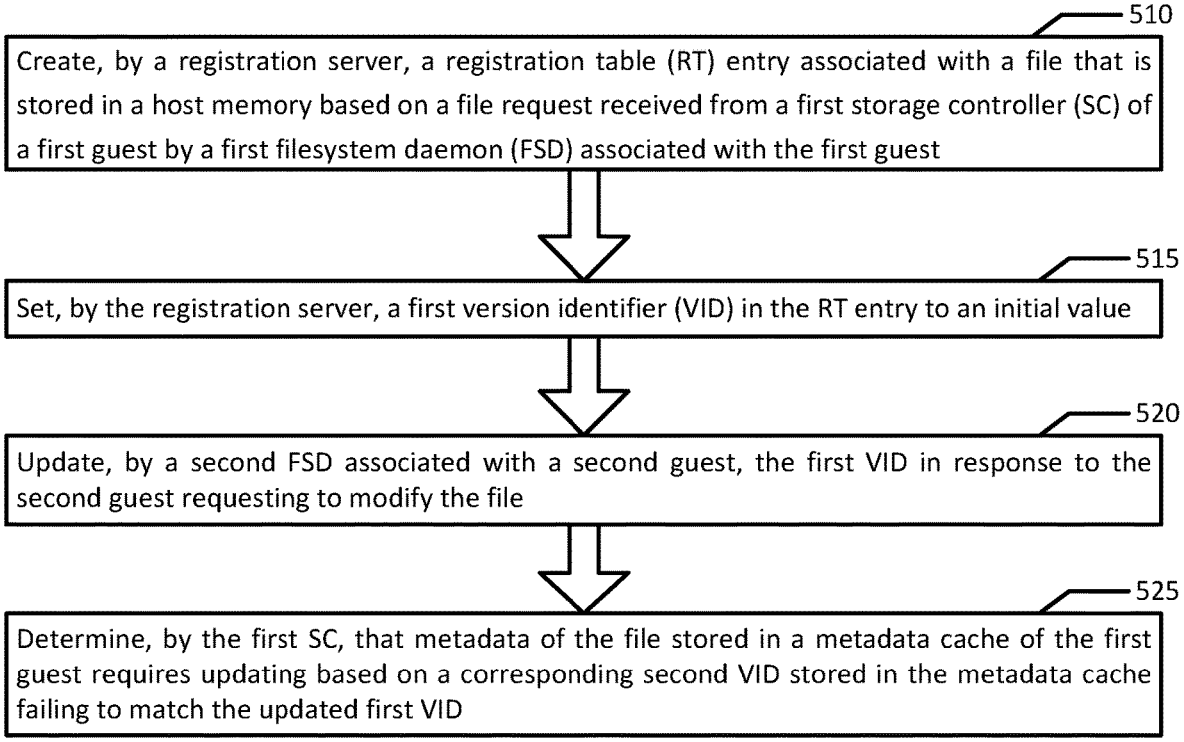
FIG. 5 is a flowchart illustrating an example of configuring version tracking for a shared file according to an example of the present disclosure.

FIG. 5 is a flowchart illustrating an example of configuring version tracking for a shared file according to an example of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both. In an example, the method 500 is performed by hypervisor 120, which includes filesystem daemon 130 and registration server 134.

Example method 500 may begin with a registration server creating a registration table (RT) entry associated with a file stored in a host memory based on a file request received from a first storage controller (SC) of a first guest by a first filesystem daemon (FSD) associated with the first guest (block 510). In an example, registration server 134 creates a registration table entry (e.g., identified by index ID 240A) associated with file 230 based on file 230 being requested by storage controller 140 of guest 122. In the example, guest 122 is the first requestor of file 230 since host 110 was last restarted, or since all other guests as well as host 110 had previously closed file 230. In such an example, file 230 may typically not be loaded into random access memory, and the request to access file 230 may trigger a page fault. Registration server 134 may therefore be notified of the access request for file 230 either via hypervisor 120 (e.g., FS daemon 130), or by OS 118 in response to the page fault. In an example, guest 122 is configured with a guest memory device (e.g., a guest memory device that appears to applications (e.g., application 160A) on guest 122 as a PCI device). In the example, this guest memory device is configured to expose parts of memory device 114 of host 110 to guest 122 via a virtual filesystem. In an example, filesystem commands of the guest memory device are communicated via filesystem queues established between a storage controller 140 of the guest memory device and a filesystem daemon 130 in hypervisor 120 of the host 110.

The registration server sets a first version identifier (VID) in the RT entry to an initial value (block 515). In an example, upon initializing the registration table entry of file 230, a version ID 242A of the entry is set to an initial value (e.g., 0). A second FSD associated with a second guest updates the first VID in response to the second guest requesting to modify the file (block 520). In an example, guest 124 later requests access to file 230, and requests to update file 230. In response to guest 124 updating file 230, the version ID 242A is changed to reflect that file 230 has been updated. For convenience and to avoid repeating version ID values, version ID 242A (e.g., 0) may be incremented with each change to file 230 (e.g., from 0 to 1). In some examples, a lock may be requested on file 230 by guest 124. For example, a request to open file 230 may be differentiated from a request to open file 230 for modification. In the example, FS daemon 132 may request lock 344A (e.g., a Boolean flag) to be updated to a locked state in response to a request to open file 230 for modification. In an example, registration server 134 may be configured to handle locking requests. Alternatively, FS daemon 132 may be configured to directly set the locked state in response to the modification request. In an example, guest 122 identifies that file 230 is being modified based on the lock state in lock 344A. In an example, storage controller 150 causes metadata 262A to be updated. For example, storage controller 150 updates metadata cache 156 with updates to the metadata corresponding to updating file 230 into file 330. These changes are then copied from metadata cache 156 to memory device 114. In another example, storage controller 150 either directly updates metadata 262A in memory device 114 and requests FS daemon 132 to commit the changes, or storage controller 150 communicates requested changes to metadata 262A to FS daemon 132, which then requests the changes to be made via hypervisor 120.

The first SC determines that metadata of the file stored in a metadata cache of the first guest requires updating based on a corresponding second VID stored in the metadata cache failing to match the updated first VID (block 525). In an example, storage controller 140 receives a metadata request (or a file operation request) relating to file 230. In the example, storage controller 140 compares cached version ID 252 in metadata cache 146 to the current version ID 342A in registration table 135. In the example, if version ID 252 matched version ID 342A, then storage controller 140 identifies that metadata 262B is current and that metadata 262B may be used to respond to a metadata request. If version ID 252 fails to match version ID 342A, then metadata 262B requires updating (e.g., from memory device 114).

In an example, both guest 122 and 124 are configured to directly access file 230 and/or metadata 262A by having a host memory address (e.g., a host virtual address) of file 230 and/or metadata 262A directly mapped into guest memory as a corresponding set of guest physical and guest virtual memory addresses (e.g., in hypervisor page table 137 and page table 248). In such examples, host 110 avoids creating additional copies of file 230, which may provide lower file access latency as well as conserve memory capacity. However, allowing a guest to directly modify host memory may potentially introduce additional security concerns and requires a higher level of trust between hypervisor 120 and guest supervisors (e.g., guest OS 196A). In addition, in some implementations higher performance may also be achieved by opening files while bypassing page cache operations (e.g., FOPEN_DIRECT_IO). In an example, by mapping HPA 271A directly into guest 122's memory space as GPA 281A, file 230 does not need to be retrieved or cached into host virtual memory for FS daemon 130 to package and send file 230 as a message through FS queues 142 or 144, saving at least one copy operation. In addition, GPA 281A may be mapped into an address space of application 160A (e.g., as GVA 291). In such an example, the guest 122's page cache may also be avoided, therefore further reducing latency and memory capacity usage. In an example, FS daemon 130 determines a file to be mapped (e.g., file 230) based on a request from storage controller 140. In the example, FS daemon 130 opens a file identifier (e.g., a file descriptor and/or inode associated with host OS 118) for file 230, and passes the file identifier to hypervisor 120 for hypervisor 120 to perform memory mapping in hypervisor page table 137 and/or guest page table 248. In an example, hypervisor 120 locates file 230 in memory device 114 or another memory device (e.g., DRAM, HDD, SSD, persistent memory) associated with host OS 118 based on the file identifier. In an example, hypervisor 120 may execute a mmap( ) call to map all or part of file 230 to guest 122's memory space (e.g., a guest memory address identified as available in request 220). In an example, when hypervisor 120 maps file 230 to guest 122's memory space (e.g., at GVA 291), file 230 may not yet be loaded to random access memory (e.g., memory device 114) on host 110. Instead, file 230 may be stored in a persistent storage device (e.g., HDD, SSD) and HPA 271A may identify a reserved host memory address into which file 230 will be paged when the contents of file 230 are requested.

In an example, guest 122 directly accesses file 230 in memory device 114 via mappings to HPA 271A of file 230.

In an example, file 230 is only loaded to HPA 271A after guest 122 requests to open the contents of GVA 291 (and therefore GPA 281A and HPA 271A). In an example, attempting to retrieve the contents of GVA 291 prior to file 230 being loaded to HPA 271A triggers a page fault, causing file 230 to be transferred from persistent storage to HPA 271A. In an example, guest 122 updates file 230 and requests to commit the update to persistent storage (e.g., memory device 114). In the example, guest 122 (e.g., guest OS 196A) issues a memory synchronization request (e.g., msync( ), fsync( )) that is intercepted by storage controller 140, and storage controller 140 sends a corresponding memory synchronization request in a format compatible with FS daemon 130 to FS daemon 130 via FS queue 142 or 144. In the example, FS daemon 130 and/or hypervisor 120 validates guest 122's authority to update file 130. In an example, FS daemon 130 issues a synchronization request to a supervisor of host 110 (e.g., hypervisor 120, host OS 118) associated with the updated file 230 (e.g., via a file identifier, file descriptor, file handle, etc.). In the example, the synchronization request (e.g., fsync( ), fdatasyn( )) causes the supervisor to transfer the updates from a transient memory (e.g., random access memory, CPU cache, etc.) to a persistent storage volume (e.g., HDD, SSD, persistent memory). In an example, FS daemon 130 issues a memory synchronization request that includes a change freeze operation to prevent conflicting data updates and a durability operation to commit requested data updates (e.g., a "fence" operation). For example, a memory synchronization operation (e.g., msync) may issue a flush command to ensure that any contents in the CPU cache of CPU 112 are moved to persistent memory (e.g., memory device 114), and then issue a fence command to prevent any other updates to the memory page updated by guest 122 until after all necessary metadata updates are complete. In an example, FS daemon 130 also provides access to file 230 to guest 124, and upon guest 122 saving changes to file 230, the changes are immediately reflected in guest 124 based on both guests accessing a same copy of the file in the host memory device 114.

In an example, guest 122 may affirmatively terminate access to file 230 (e.g., by sending a file close request to FS daemon 130 via FS queue 142 or 144). In another example, guest 122 may stop performing any active file operations (e.g., read, write, execute) on file 230 for a sufficient duration such that guest 122's access to file 230 exceeds a timeout threshold. In an example, FS daemon 130 and/or hypervisor 120 is configured to reclaim memory capacity in device memory 292 and/or guest memory 195A. In the example, memory cleanup may be triggered by a variety of triggers, for example, a configured memory usage capacity threshold may be exceeded, an access timeout threshold (e.g., for file requests corresponding to file 230 and/or other files in memory device 114) may be exceeded, an address space usage threshold for page table 248 may be exceeded (e.g., memory addresses need to be unmapped for new mappings), or an affirmative unmapping request may be received. In an example, guest OS 196A determines that the memory usage capacity threshold, the access timeout threshold, and/or the address space usage threshold is exceeded and requests FS daemon 130 (e.g., via storage controller 140) to perform memory cleanup by unmapping memory addresses in page table 248. In an example, if file 230 is unmapped by all storage controllers of guests on host 110, the corresponding registration table entry for file 230 may be removed.

In an example, rather than mapping the host memory address of a requested file (e.g., HPA 271A of file 230) to guest 122 to allow guest 122 access to file 230, file 230 may instead be transmitted via FS queue 142 or 144. In the example, FS daemon 130 requests file 230 from memory device 114 via hypervisor 120 in response to request 220 and access to file 230 to provide a copy of file 230 to guest 122. In the example, a supervisor of host 110 (e.g., host OS 118, hypervisor 120) may have access to FS queues 142 and/or 144. In the example, hypervisor 120 may directly load data to FS queue 142 or 144. In response to a file request. In an example, storage controller 140 and FS daemon 130 may request and handle files on a file basis rather than a block or page basis. In the example, translation to and from handling file contents to block or page memory addresses may be handled by hypervisor 120. In an example, retrieved file 230, or a requested portion of file 230 is loaded to a separate FS queue (e.g., not used for request transmission) for transmission to storage controller 140 and access by application 160A. In an example, FS daemon 130 and/or hypervisor 120 may be configured to assess guest 122, guest OS 196A, and/or application 160A's access permissions to file 230, and may reject the access request to file 230 based on a failed access permissions check.

Figure 6:
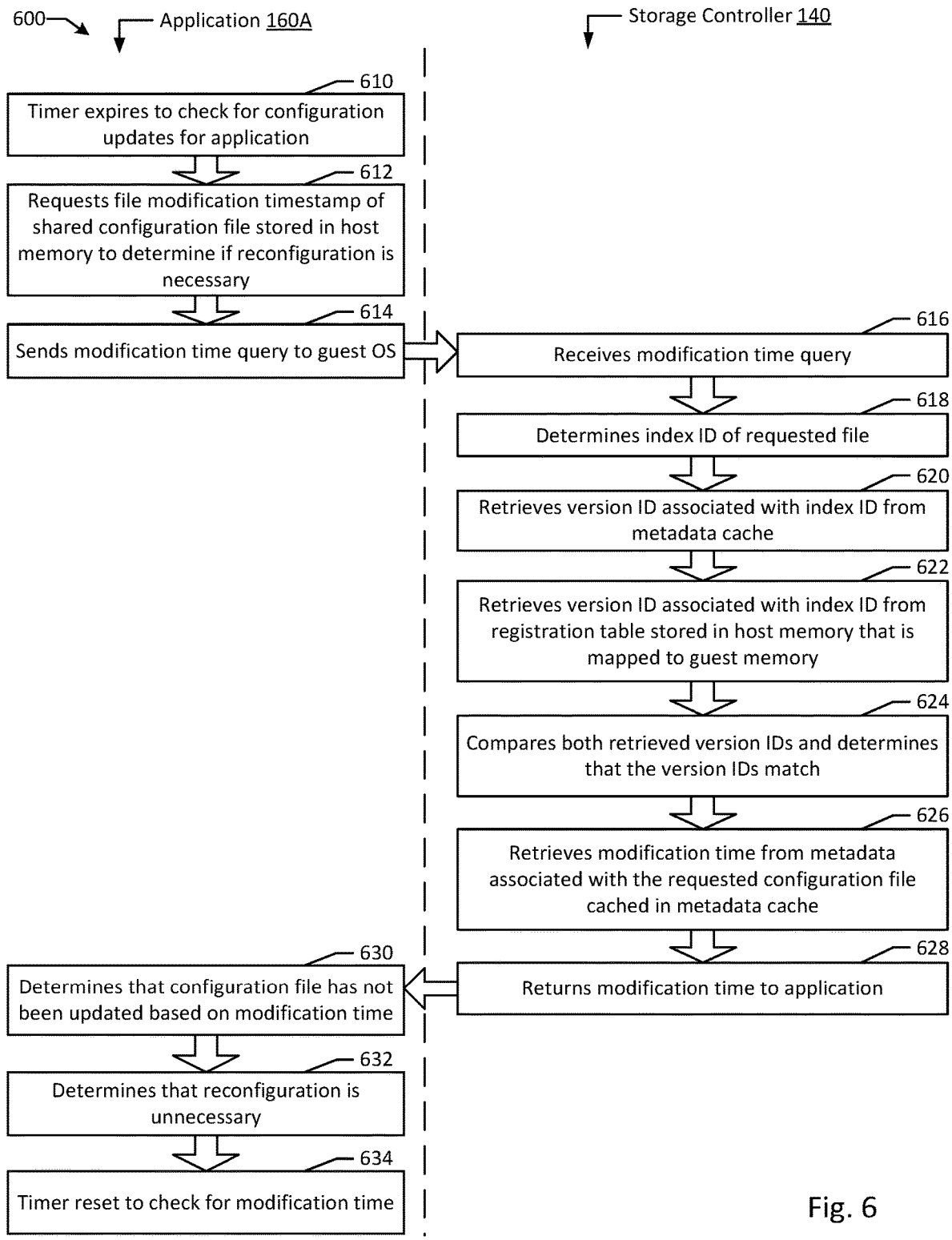
FIG. 6 is flow diagram of a guest handling a metadata request according to an example of the present disclosure.

FIG. 6 is flow diagram of a guest handling a metadata request according to an example of the present disclosure. Although the examples below are described with reference to the flow diagram illustrated in FIG. 6, it will be appreciated that many other methods of performing the acts associated with FIG. 6 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 600, application 160A requests metadata associated with a file stored in memory device 114 via storage controller 140.

In example system 600, application 160A executing on guest 122 is a network application configured to periodically check for updated network configurations (e.g., /etc/host-.config). In an example, a timer governs how often application 160A checks for new configuration updates and the timer expires (block 610). In an example, application 160A requests the file modification timestamp of the configuration file stored in host memory 114 to determine if reconfiguration is necessary (block 612). For example, application 160A requests guest OS 195A to retrieve the file modification timestamp via a modification time query (block 614).

In an example, storage controller 140 is part of a driver for a guest memory device mounted on guest OS 196A (e.g., guest memory 195A). In the example, storage controller 140 receives the modification time query from guest OS 196A (block 616). Storage controller 140 determines an index ID (e.g., an inode) corresponding to file 230 (e.g., /etc/host-.config) (block 618). In the example, storage controller 140 retrieves a version ID 252 associated with file 230 (e.g., via index ID 240C and/or file ID 232) from metadata cache 146. Storage controller 140 additionally retrieves version ID 242A/B from registration table 135 (which is exposed as registration table 235 to storage controller 140) (block 622). In an example, registration table 135 is mapped as a read only registration table 235 into guest memory 195A, allowing storage controller 140 to directly retrieve the contents of registration table 135. Storage controller 140 compares version ID 252 with version ID 242B and determines that the version IDs match (block 624). Storage controller 140 then retrieves the modification time from cached metadata 262B, which has been confirmed as current (block 626). Storage controller 140 responds to the modification time query by returning the modification time in metadata 262B to application 160A (block 628).

Application 160A determines that the configuration file 230 has not been updated based on the retrieved modification time (block 630). As a result, application 160A determines that reconfiguration is unnecessary (block 632). In an example, application 160A then resets its timer to check for modifications to file 230 again in the future (block 634).

Figure 7:
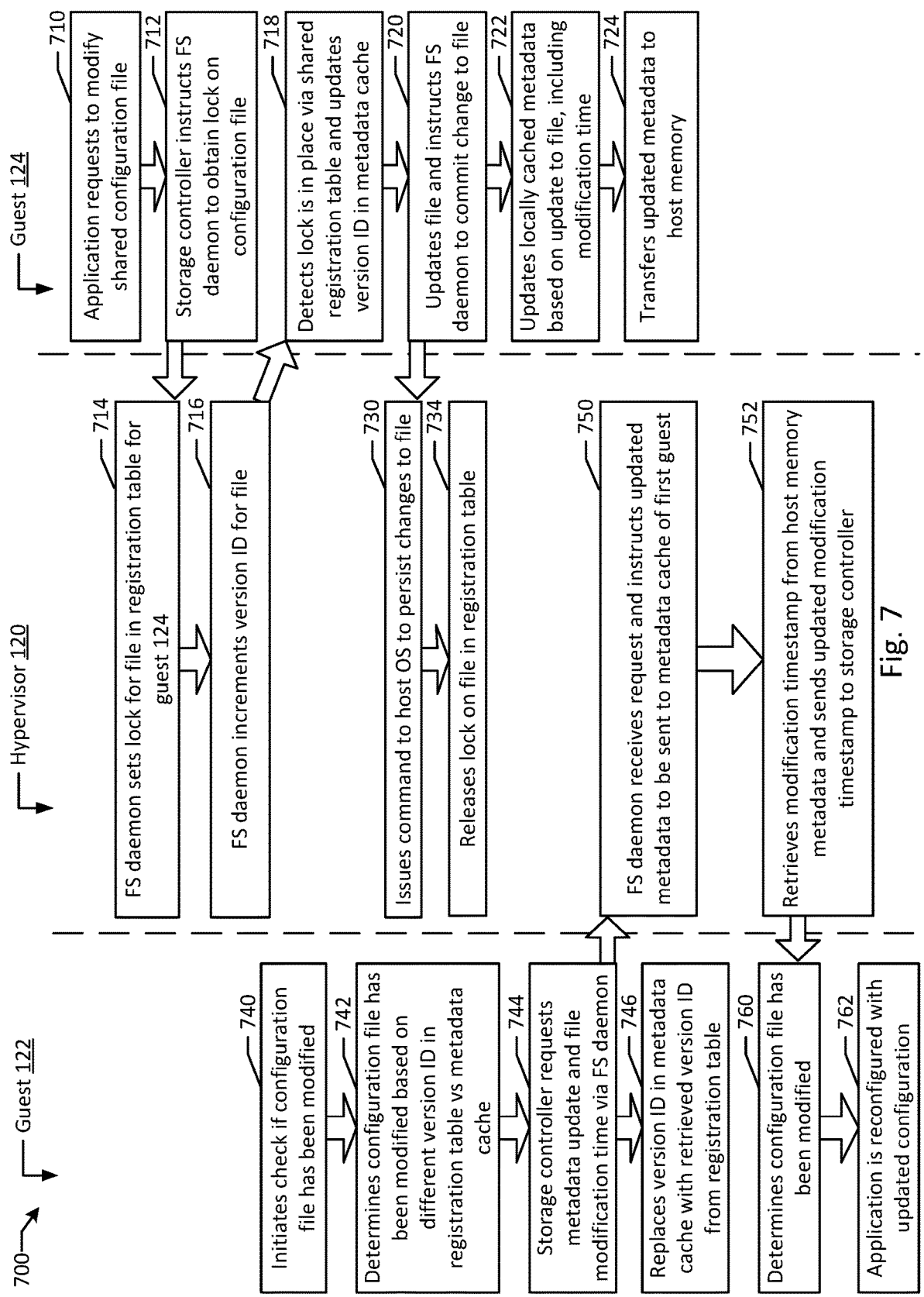
FIG. 7 is flow diagram of two guests sharing access to a file stored in host memory according to an example of the present disclosure.

FIG. 7 is flow diagram of two guests sharing access to a file stored in host memory according to an example of the present disclosure. Although the examples below are described with reference to the flow diagram illustrated in FIG. 7, it will be appreciated that many other methods of performing the acts associated with FIG. 7 may be used. For example, the order of some of the blocks may be changed, certain blocks may be combined with other blocks, and some of the blocks described are optional. The methods may be performed by processing logic that may comprise hardware (circuitry, dedicated logic, etc.), software, or a combination of both. In illustrated example 700, application guests 122 and 124 both access a file in memory device 114 via hypervisor 120.

In example system 700, guest 124 also has access to file 230. In an example, application 160B (e.g., another copy of application 160A) executing on guest 124 requests to modify shared configuration file 230 (block 710). Storage controller 150 receives the modification request and instructs FS daemon 132 to obtain a lock on configuration file 230 (block 712). In an example, FS daemon 132 on hypervisor 120 sets lock 344A to a locked state for file 230 in registration table 135 in favor of guest 124 (block 714). In an example, lock 344A may store a current "owner" of file 230 that requested the lock. However, in systems where locks are typically transient (e.g., automatically updates systems), a two state Boolean flag may be sufficient as locks may typically be quickly released. In an example, FS daemon 132 increments version ID 242A of file 230 in registration table 135 to version ID 342A (block 716).

In an example, storage controller 150 detects that the modification lock is in place based on accessing registration table 135, and in response, updates the version ID 342B in metadata cache 156 to match version ID 342A in registration table 135 (block 718). Guest 124 (e.g., application 160B and storage controller 150) then updates file 230 by directly modifying the contents of file 230 in memory device 114, requesting FS daemon 132 to commit the changes (block 720). Storage controller 150 additionally updates locally cached metadata 362A to reflect the changes to file 230, including updating the modification timestamp of file 230 (block 722). Storage controller 150 then transfers the updated metadata 362A to memory device 114 (e.g., as metadata 362B) (block 724). Storage controller may additionally request FS daemon 132 to commit the metadata update. In some examples, updating metadata 362B may be performed instead by a storage controller of memory device 114 or by host OS 118. In such examples, the updated metadata would be retrieved from memory device 114 rather than being transferred to memory device 114. In addition, storage controller 150 may be configured to directly update the metadata on memory device 114. In an example, FS daemon 132 issues a command to host OS 118 or hypervisor 120 to persist changes to file 230 (block 730). In an example, after committing the changes into persistence, FS daemon 132 releases the lock on file 230 (now updated file 330) in registration table 135 (block 734).

In an example, guest 124 initiates a check to see if configuration file 230 has been modified (block 740). In the example, storage controller 140 determines that configuration file 230 has been modified based on version ID 252 in metadata cache 146 failing to match version ID 324A in registration table 135 (block 742). In response, storage controller 140 requests metadata 262B to be updated via FS daemon 130, and additionally requests FS daemon 130 to provide the current modification timestamp retrieved from metadata 362B (block 744). In various alternative examples, storage controller 140 may be configured with direct access to retrieve metadata 362B's contents, or storage controller 140 may wait for metadata cache 146 to be updated before retrieving the updated modification timestamp from metadata cache 146. In an example, storage controller 140 replaces version ID 252 in metadata cache 146 with a copy of the retrieved version ID 324A (e.g., as version ID 324C) (block 746).

In an example, FS daemon 130 receives the metadata request from storage controller 140 and instructs host OS 118 and/or hypervisor 120 to send the updated metadata 362B to metadata cache 146 (block 750). FS daemon 130 also retrieves the modification timestamp based on guest 124 modifying file 230 from host memory device 114's metadata 362B, and sends the updated modification timestamp to storage controller 140 (block 752). Storage controller 140 sends the updated modification timestamp to application 160A which determines that the configuration file 230 (e.g., file 330) has been modified (block 760). Application 160A is then reconfigured with the updated configuration (block 760). In an example, prior to being reconfigured application 160A may additionally validate whether a substantive update has been made to file 230 (e.g., by checking a hash value of file 330 vs. a stored hash value of file 230). For example, a metadata update may be made based on a change that does not change the substantive contents of file 230 (e.g., a new symbolic link being created, a "touch" command being executed on file 230, etc.).

Figure 8:
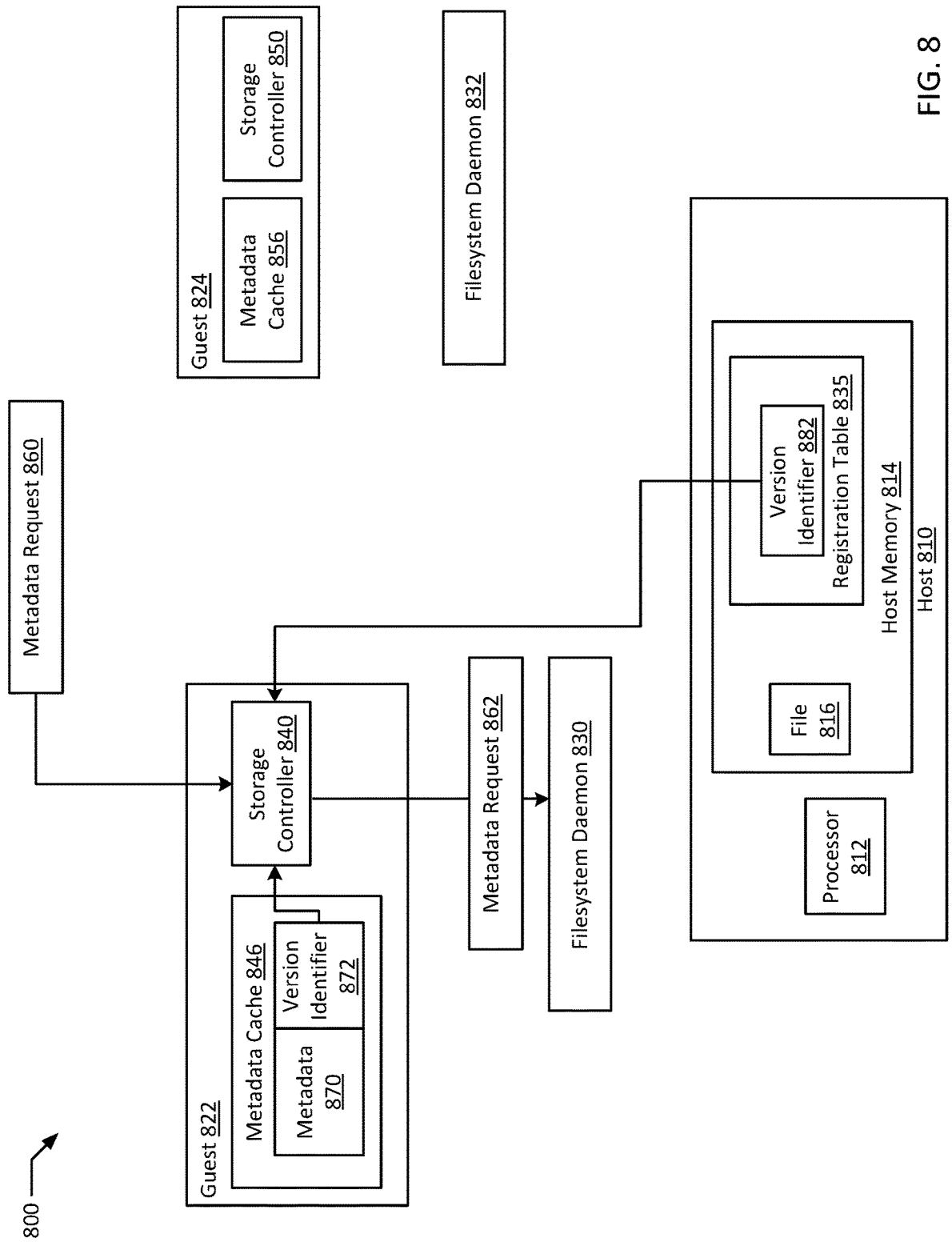
FIG. 8 is a block diagram of an example shared filesystem metadata caching system according to an example of the present disclosure.

FIG. 8 is a block diagram of an example shared filesystem metadata caching system according to an example of the present disclosure. Example system 800 includes a host 810 with (i) a processor 812, (ii) guest 822 with storage controller 840 and metadata cache 846 associated with filesystem daemon 830, (iii) guest 824 with storage controller 850 and metadata cache 856 associated with filesystem daemon 832, and (iv) host memory 814 storing registration table 835. Storage controller 840 is configured to receive metadata request 860 associated with file 816 stored in host memory 814. Storage controller 840 retrieves version identifier 870 of metadata 870 associated with file 816 from metadata cache 846. Version identifier 870 is validated against a corresponding version identifier 882 in registration table 835. In response to determining that version identifier 872 matches version identifier 882, storage controller 840 responds to metadata request 860 based on metadata 870 in metadata cache 846.

In response to determining that version identifier 872 fails to match version identifier 882, storage controller 840 sends metadata request 862 based on metadata request 860 to filesystem daemon 830 to update metadata 870. Version identifier 872 is updated to match version identifier 882 and storage controller 840 responds to metadata request 860 based on the updated version of metadata 870.

Figure 9:
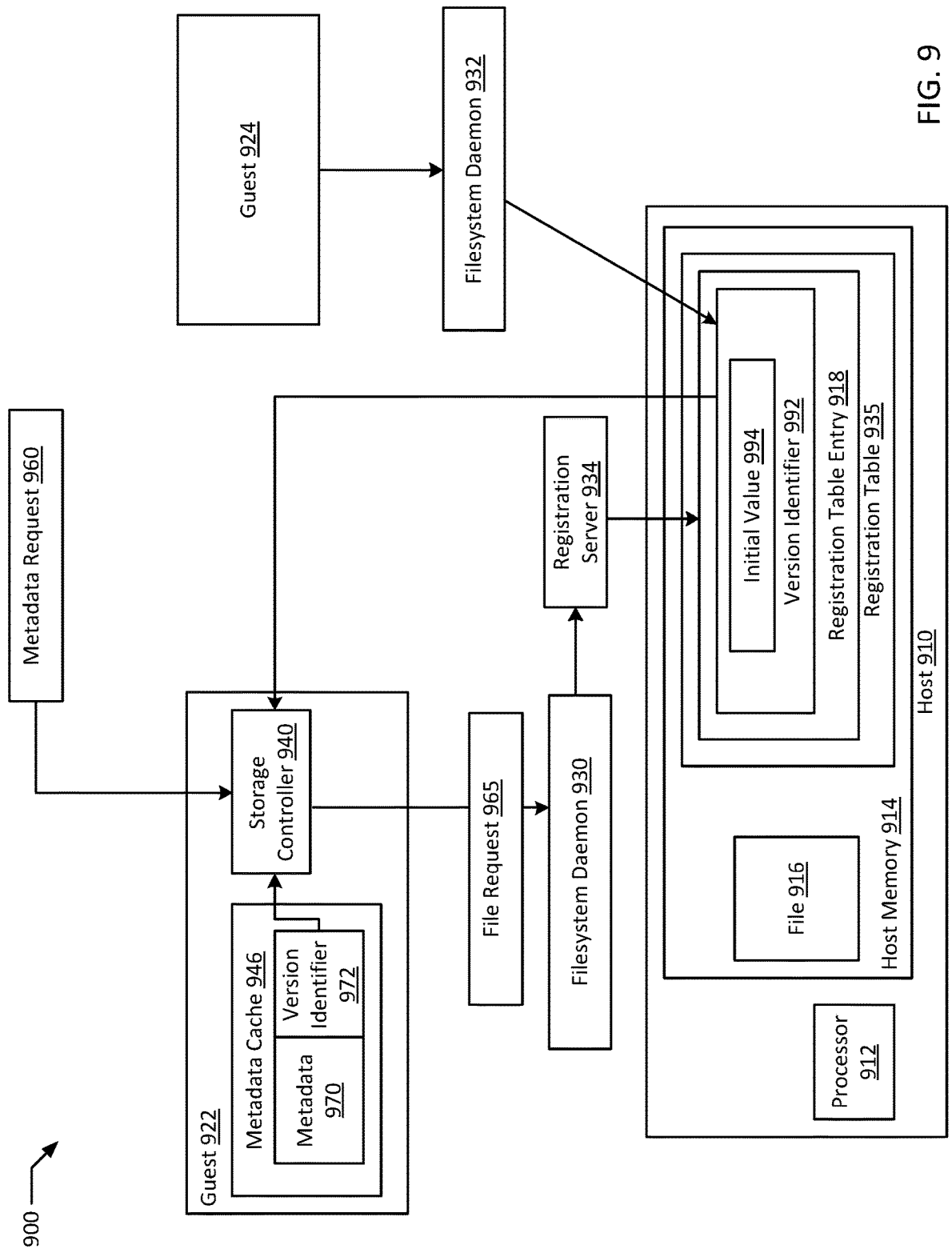
FIG. 9 is a block diagram of an example shared filesystem metadata caching system according to an example of the present disclosure.

FIG. 9 is a block diagram of an example shared filesystem metadata caching system according to an example of the present disclosure. Example system 900 includes a host 910 with (i) a processor 912, (ii) guest 922 with storage controller 940 and metadata cache 946 associated with filesystem daemon 930, (iii) guest 924 associated with filesystem daemon 932, (iv) registration server 934, and (v) host memory 914 storing registration table 935. Registration server 934 is configured to create registration table entry 918 associated with file 916 stored in host memory 914 in registration table 935 based on a file request 965 associated with file 916 received from storage controller 940 by filesystem daemon 930. A version identifier 992 in registration table entry 918 is set to initial value 994. Filesystem daemon 932 is configured to update version identifier 992 in response to guest 924 requesting to modify file 916. Storage controller 940 is configured to determine that metadata 970 of file 916 in metadata cache 946 requires updating based on corresponding version identifier 972 stored in metadata cache 946 failing to match the updated version identifier 992.

Shared filesystem metadata caching as described in the present disclosure enables metadata operations performed by guests on virtual filesystems that expose host memory storage to the guests to be performed significantly faster (e.g., orders of magnitude faster) where the requested data in a guest metadata cache is verified as current. In systems where paravirtualized memory devices are implemented to allow guests to share memory with each other and with their host, metadata operations, which typically account for half or more of all file operations, may therefore be performed with vastly improved latency. In addition, by implementing these virtual filesystems with queues accessible to both guests and their hosts, while restricting messages in those queues to messages of certain restricted types, file operations may be passed from guest to host without requiring the guest to have any heightened access or control over the host. Advantageously, data security is therefore similar to data retrieval over networking protocols. Where multiple guests share the same file in host memory, the file sharing may be additionally used as a very fast communication channel between the two guests, since changes to the file are reflected to all of the guests accessing the file simultaneously. These guests may additionally utilize version tracking provided by the registration table disclosed herein as a notification channel that data has been updated. As a result, processing tasks in shared environments are more efficient due to less latency from file sharing operations between guests and between guests and their hosts, and therefore higher compute utilization may be advantageously achieved.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

Aspects of the subject matter described herein may be useful alone or in combination with one or more other aspects described herein. In a 1st exemplary aspect of the present disclosure, a metadata caching system for shared filesystems comprises: a host with (i) a processor, (ii) a first guest with a first storage controller (SC) and a first metadata cache, associated with a first filesystem daemon (FSD), (iii) a second guest with a second SC and a second metadata cache, associated with a second FSD, (iv) a registration server, and (v) a host memory storing a registration table (RT), wherein the first SC is configured to: receive a first metadata request associated with a first file stored in the host memory; retrieve a first version identifier (VID) of first metadata associated with the first file from the first metadata cache; validate the first VID against a corresponding second VID in the RT; responsive to determining that the first VID matches the second VID, respond to the first metadata request based on the first metadata in the first metadata cache; and responsive to determining that the first VID fails to match the second VID, send a second metadata request to the first FSD, based on the first metadata request, to update the first metadata; update the first VID to match the second VID; and respond to the first metadata request based on the updated first metadata.

In accordance with a 2nd exemplary aspect of the present disclosure, which may be used in combination with any one or more of other aspects described herein (e.g., the 1st aspect), wherein after the first SC responds to the first metadata request, the second SC is configured to: receive a first file update request to update the first file; send a second file update request based on the first file update request to the second FSD; wherein the second FSD is configured to: instruct an operating system of the host to commit a change to the first file; and update the second VID. In accordance with a 3rd exemplary aspect of the present disclosure, which may be used in combination with any one or more of other aspects described herein (e.g., the 2nd aspect), wherein the second file update request is sent via a filesystem queue accessible to both the second SC and the second FSD, and the filesystem queue is inaccessible to the first guest. In accordance with a 4th exemplary aspect of the present disclosure, which may be used in combination with any one or more of other aspects described herein (e.g., the 2nd aspect), wherein updating the second VID includes incrementing a value of the second VID.

In accordance with a 5th exemplary aspect of the present disclosure, which may be used in combination with any one or more of other aspects described herein (e.g., the 1st aspect), wherein the first FSD is configured to: receive a file request associated with a second file in the host memory, wherein the second file is unaccessed by any guest executing on the host; and responsive to receiving the file request, instruct the registration server to create a RT entry in the RT associated with the second file, wherein the RT entry includes a third VID associated with the second file and a file descriptor of the second file. In accordance with a 6th exemplary aspect of the present disclosure, which may be used in combination with any one or more of other aspects described herein (e.g., the 5th aspect), wherein the RT entry additionally includes a modification lock state of the second file.

In accordance with a 7th exemplary aspect of the present disclosure, which may be used in combination with any one or more of other aspects described herein (e.g., the 1st aspect), wherein a request to update a second file dependent on the first file results in an update to the second VID. In accordance with an 8th exemplary aspect of the present disclosure, which may be used in combination with any one or more of other aspects described herein (e.g., the 1st aspect), wherein a host memory address (HMA) of the first file is mapped to both a first guest memory address (GMA)

of the first guest and a second GMA of the second guest, the first guest is configured to directly access the first file via the first GMA, and the second guest is configured to directly access the first file via the second GMA. In accordance with a 9th exemplary aspect of the present disclosure, which may be used in combination with any one or more of other aspects described herein (e.g., the 1st aspect), wherein a RT entry that includes the second VID is removed from the RT after all guests on the host terminate access to the first file. In accordance with a 10th exemplary aspect of the present disclosure, which may be used in combination with any one or more of other aspects described herein (e.g., the 1st aspect), wherein the registration server has read/write access to the RT, and the first guest, including the first SC are restricted to read only access to the RT. In accordance with an 11th exemplary aspect of the present disclosure, which may be used in combination with any one or more of other aspects described herein (e.g., the 1st aspect), wherein the first FSD responds to the second metadata request to the first SC based on the updated first metadata, and the first SC responds to the first metadata request based on the response from the first FSD. In accordance with a 12th exemplary aspect of the present disclosure, which may be used in combination with any one or more of other aspects described herein (e.g., the 1st aspect), wherein the first metadata request includes at least one of a metadata lookup, a path lookup, a directory contents lookup, and a symbolic link lookup. In accordance with a 13th exemplary aspect of the present disclosure, which may be used in combination with any one or more of other aspects described herein (e.g., the 1st aspect), wherein the RT is mapped into a first memory space of the first guest and a second memory space of the second guest. In accordance with a 14th exemplary aspect of the present disclosure, which may be used in combination with any one or more of other aspects described herein (e.g., the 1st aspect), wherein the first FSD is the second FSD.

Aspects of the subject matter described herein may be useful alone or in combination with one or more other aspects described herein. In a 15th exemplary aspect of the present disclosure, a metadata caching system for shared filesystems comprises: a means for receiving, by a storage controller (SC) of a guest, a first metadata request associated with a file stored in a host memory of a host of the guest; a means for retrieving, by the SC, a first version identifier (VID) of metadata associated with the file from a metadata cache of the guest; a means for validating, by the SC, the first VID against a corresponding second VID in a registration table (RT) stored in the host memory; responsive to determining that the first VID matches the second VID, a means for responding to the first metadata request based on the metadata in the metadata cache; and responsive to determining that the first VID fails to match the second VID, a means for sending a second metadata request to a filesystem daemon (FSD), based on the first metadata request, to update the metadata; a means for updating the first VID to match the second VID; and a means for responding to the first metadata request based on the updated metadata.

Aspects of the subject matter described herein may be useful alone or in combination with one or more other aspects described herein. In a 16th exemplary aspect of the present disclosure, a computer-readable non-transitory storage medium storing executable instructions for caching metadata for shared filesystems, which when executed by a computer system, cause the computer system to: receive, by a storage controller (SC) of a guest, a first metadata request associated with a file stored in a host memory of a host of the guest; retrieve, by the SC, a first version identifier (VID) of metadata associated with the file from a metadata cache of the guest; validate, by the SC, the first VID against a corresponding second VID in a registration table (RT) stored in the host memory; responsive to determining that the first VID matches the second VID, respond to the first metadata request based on the metadata in the metadata cache; and responsive to determining that the first VID fails to match the second VID, send a second metadata request to a filesystem daemon (FSD), based on the first metadata request, to update the metadata; update the first VID to match the second VID; and respond to the first metadata request based on the updated metadata.

Aspects of the subject matter described herein may be useful alone or in combination with one or more other aspects described herein. In a 17th exemplary aspect of the present disclosure, a method of caching metadata for shared filesystems comprises: receiving, by a first storage controller (SC) of a first guest, a first metadata request associated with a first file stored in a host memory of a host of the first guest and a second guest; retrieving, by the first SC, a first version identifier (VID) of first metadata associated with the first file from a first metadata cache of the first guest; validating, by the first SC, the first VID against a corresponding second VID in a registration table (RT) stored in the host memory; responsive to determining that the first VID matches the second VID, responding to the first metadata request based on the first metadata in the first metadata cache; and responsive to determining that the first VID fails to match the second VID, sending a second metadata request to a first filesystem daemon (FSD), based on the first metadata request, to update the first metadata; updating the first VID to match the second VID; and responding to the first metadata request based on the updated first metadata.

In accordance with an 18th exemplary aspect of the present disclosure, which may be used in combination with any one or more of other aspects described herein (e.g., the 15th, 16th, or 17th aspects), wherein after the first SC responds to the first metadata request, a second SC of the second guest is configured to: receive a first file update request to update the first file; send a second file update request based on the first file update request to a second FSD, wherein the second FSD is configured to: instruct an operating system of the host to commit a change to the first file; and update the second VID. In accordance with a 19th exemplary aspect of the present disclosure, which may be used in combination with any one or more of other aspects described herein (e.g., the 18th aspect), wherein the second file update request is sent via a filesystem queue accessible to both the second SC and the second FSD, and the filesystem queue is inaccessible to the first guest. In accordance with a 20th exemplary aspect of the present disclosure, which may be used in combination with any one or more of other aspects described herein (e.g., the 18th aspect), wherein updating the second VID includes incrementing a value of the second VID.

In accordance with an 21st exemplary aspect of the present disclosure, which may be used in combination with any one or more of other aspects described herein (e.g., the 15th, 16th, or 17th aspects), wherein the first FSD is configured to: receive a file request associated with a second file in the host memory, wherein the second file is unaccessed by any guest executing on the host; and responsive to receiving the file request, instruct the registration server to create a RT entry in the RT associated with the second file, wherein the RT entry includes a third VID associated with the second file and a file descriptor of the second file. In accordance with a 22nd exemplary aspect of the present disclosure, which may be used in combination with any one or more of other aspects described herein (e.g., the 21st aspect), wherein the RT entry additionally includes a modification lock state of the second file.

In accordance with an 23rd exemplary aspect of the present disclosure, which may be used in combination with any one or more of other aspects described herein (e.g., the 15th, 16th, or 17th aspects), wherein a request to update a second file dependent on the first file results in an update to the second VID. In accordance with an 24th exemplary aspect of the present disclosure, which may be used in combination with any one or more of other aspects described herein (e.g., the 15th, 16th, or 17th aspects), wherein a host memory address (HMA) of the first file is mapped to both a first guest memory address (GMA) of the first guest and a second GMA of the second guest, the first guest is configured to directly access the first file via the first GMA, and the second guest is configured to directly access the first file via the second GMA. In accordance with an 25th exemplary aspect of the present disclosure, which may be used in combination with any one or more of other aspects described herein (e.g., the 15th, 16th, or 17th aspects), wherein a RT entry that includes the second VID is removed from the RT after all guests on the host terminate access to the first file. In accordance with an 26th exemplary aspect of the present disclosure, which may be used in combination with any one or more of other aspects described herein (e.g., the 15th, 16th, or 17th aspects), wherein the registration server has read/write access to the RT, and the first guest, including the first SC are restricted to read only access to the RT. In accordance with an 27th exemplary aspect of the present disclosure, which may be used in combination with any one or more of other aspects described herein (e.g., the 15th, 16th, or 17th aspects), wherein the first FSD responds to the second metadata request to the first SC based on the updated first metadata, and the first SC responds to the first metadata request based on the response from the first FSD. In accordance with an 28th exemplary aspect of the present disclosure, which may be used in combination with any one or more of other aspects described herein (e.g., the 15th, 16th, or 17th aspects), wherein the first metadata request includes at least one of a metadata lookup, a path lookup, a directory contents lookup, and a symbolic link lookup. In accordance with an 29th exemplary aspect of the present disclosure, which may be used in combination with any one or more of other aspects described herein (e.g., the 15th, 16th, or 17th aspects), wherein the RT is mapped into a first memory space of the first guest and a second memory space of the second guest.

Aspects of the subject matter described herein may be useful alone or in combination with one or more other aspects described herein. In a 30th exemplary aspect of the present disclosure, a metadata caching system for shared filesystems comprises: a host with (i) a processor, (ii) a first guest with a first storage controller (SC) and a first metadata cache, associated with a first filesystem daemon (FSD), (iii) a second guest associated with a second FSD, (iv) a registration server, and (v) a host memory with a registration table (RT), wherein the registration server is configured to: create a first RT entry associated with a first file stored in the host memory in the RT based on a file request associated with the first file received from the first SC by the first FSD; set a first version identifier (VID) in the first RT entry to an initial value, wherein the second FSD is configured to: update the first VID in response to the second guest requesting to modify the first file, and wherein the first SC is configured to: determine that first metadata of the first file in the first metadata cache requires updating based on a corresponding second VID stored in the first metadata cache failing to match the updated first VID.

In accordance with a 31st exemplary aspect of the present disclosure, which may be used in combination with any one or more of other aspects described herein (e.g., the 30th aspect), wherein the first SC is configured to: receive a first metadata request associated with the first file; retrieve the second VID from the first metadata cache; validate the second VID against the first VID; and responsive to determining that the second VID matches the first VID, respond to the first metadata request based on the first metadata. In accordance with a 32nd exemplary aspect of the present disclosure, which may be used in combination with any one or more of other aspects described herein (e.g., the 30th aspect), wherein the first SC is configured to: receive a first metadata request associated with the first file; retrieve the second VID from the first metadata cache; validate the second VID against the first VID; and responsive to determining that the second VID fails to match the first VID, send a second metadata request to the first FSD to update the first metadata; update the second VID to match the first VID; and respond to the first metadata request based on the updated first metadata. In accordance with a 33rd exemplary aspect of the present disclosure, which may be used in combination with any one or more of other aspects described herein (e.g., the 30th aspect), wherein the first file request is sent via a filesystem queue accessible to both the first SC and the first FSD, and the filesystem queue is inaccessible to the second guest. In accordance with a 34th exemplary aspect of the present disclosure, which may be used in combination with any one or more of other aspects described herein (e.g., the 30th aspect), wherein a host memory address (HMA) of the first file is mapped to both a first guest memory address (GMA) of the first guest and a second GMA of the second guest, the first guest is configured to directly access the first file via the first GMA, and the second guest is configured to directly access the first file via the second GMA. In accordance with a 35th exemplary aspect of the present disclosure, which may be used in combination with any one or more of other aspects described herein (e.g., the 30th aspect), wherein the first RT entry is removed from the RT after all guests on the host terminate access to the first file. In accordance with a 36th exemplary aspect of the present disclosure, which may be used in combination with any one or more of other aspects described herein (e.g., the 30th aspect), wherein the registration server has read/write access to the registration table, and the first guest is restricted to read only access to the registration table.

In accordance with a 37th exemplary aspect of the present disclosure, which may be used in combination with any one or more of other aspects described herein (e.g., the 30th aspect), wherein the second SC requests a file lock on the first file, and the second FSD updates one of the first VID and a lock flag associated with the first VID to grant the file lock to the second guest. In accordance with a 38th exemplary aspect of the present disclosure, which may be used in combination with any one or more of other aspects described herein (e.g., the 37th aspect), wherein the first SC determines that the first file is being updated based on the one of the updated first VID and the lock flag. In accordance with a 39th exemplary aspect of the present disclosure, which may be used in combination with any one or more of other aspects described herein (e.g., the 37th aspect), wherein the second guest updates second metadata of the first file in a second metadata cache of the second guest, and the second guest is configured to transfer the updated second metadata to the host memory after receiving the file lock.

In accordance with a 40th exemplary aspect of the present disclosure, which may be used in combination with any one or more of other aspects described herein (e.g., the 30th aspect), wherein the first guest includes a guest memory device configured to provide access to files stored in the host memory that appears to applications executing on the first guest as a peripheral component interconnect device and the first SC is a component of one of (i) the guest memory device, and (ii) a driver of the guest memory device.

Aspects of the subject matter described herein may be useful alone or in combination with one or more other aspects described herein. In a 41st exemplary aspect of the present disclosure, a system metadata caching system for shared filesystems comprises: a means for creating, by a registration server, a registration table (RT) entry associated with a file stored in a host memory in a RT stored in the host memory based on a file request associated with the file received from a first storage controller (SC) of a first guest by a first filesystem daemon (FSD) associated with the first guest; a means for setting, by the registration server, a first version identifier (VID) in the RT entry to an initial value; a means for updating, by a second FSD associated with a second guest, the first VID in response to the second guest requesting to modify the file; and a means for determining, by the first SC, that metadata of the file stored in a metadata cache of the first guest requires updating based on a corresponding second VID stored in the metadata cache failing to match the updated first VID.

Aspects of the subject matter described herein may be useful alone or in combination with one or more other aspects described herein. In a 42nd exemplary aspect of the present disclosure, a computer-readable non-transitory storage medium storing executable instructions for caching metadata for shared filesystems, which when executed by a computer system, cause the computer system to: create, by a registration server, a registration table (RT) entry associated with a file stored in a host memory in a RT stored in the host memory based on a file request associated with the file received from a first storage controller (SC) of a first guest by a first filesystem daemon (FSD) associated with the first guest; set, by the registration server, a first version identifier (VID) in the RT entry to an initial value; update, by a second FSD associated with a second guest, the first VID in response to the second guest requesting to modify the file; and determine, by the first SC, that metadata of the file stored in a metadata cache of the first guest requires updating based on a corresponding second VID stored in the metadata cache failing to match the updated first VID.

Aspects of the subject matter described herein may be useful alone or in combination with one or more other aspects described herein. In a 43rd exemplary aspect of the present disclosure, a method of caching metadata for shared filesystems comprises: creating, by a registration server, a first registration table (RT) entry associated with a first file stored in a host memory in a RT stored in the host memory based on a file request associated with the first file received from a first storage controller (SC) of a first guest by a first filesystem daemon (FSD) associated with the first guest; setting, by the registration server, a first version identifier (VID) in the first RT entry to an initial value; updating, by a second FSD associated with a second guest, the first VID in response to the second guest requesting to modify the first file; and determining, by the first SC, that first metadata of the first file stored in a first metadata cache of the first guest requires updating based on a corresponding second VID stored in the first metadata cache failing to match the updated first VID.

In accordance with a 44th exemplary aspect of the present disclosure, which may be used in combination with any one or more of other aspects described herein (e.g., the 41st, 42nd, or 43rd aspects), wherein the first SC is configured to: receive a first metadata request associated with the first file; retrieve the second VID from the first metadata cache; validate the second VID against the first VID; and responsive to determining that the second VID matches the first VID, respond to the first metadata request based on the first metadata. In accordance with a 45th exemplary aspect of the present disclosure, which may be used in combination with any one or more of other aspects described herein (e.g., the 41st, 42nd, or 43rd aspects), wherein the first SC is configured to: receive a first metadata request associated with the first file; retrieve the second VID from the first metadata cache; validate the second VID against the first VID; and responsive to determining that the second VID fails to match the first VID, send a second metadata request to the first FSD to update the first metadata; update the second VID to match the first VID; and respond to the first metadata request based on the updated first metadata.

In accordance with a 46th exemplary aspect of the present disclosure, which may be used in combination with any one or more of other aspects described herein (e.g., the 41st, 42nd, or 43rd aspects), wherein the first file request is sent via a filesystem queue accessible to both the first SC and the first FSD, and the filesystem queue is inaccessible to the second guest. In accordance with a 47th exemplary aspect of the present disclosure, which may be used in combination with any one or more of other aspects described herein (e.g., the 41st, 42nd, or 43rd aspects), wherein a host memory address (HMA) of the first file is mapped to both a first guest memory address (GMA) of the first guest and a second GMA of the second guest, the first guest is configured to directly access the first file via the first GMA, and the second guest is configured to directly access the first file via the second GMA.

In accordance with a 48th exemplary aspect of the present disclosure, which may be used in combination with any one or more of other aspects described herein (e.g., the 41st, 42nd, or 43rd aspects), wherein the first RT entry is removed from the RT after all guests on the host terminate access to the first file. In accordance with a 49th exemplary aspect of the present disclosure, which may be used in combination with any one or more of other aspects described herein (e.g., the 41st, 42nd, or 43rd aspects), wherein the registration server has read/write access to the registration table, and the first guest is restricted to read only access to the registration table. In accordance with a 50th exemplary aspect of the present disclosure, which may be used in combination with any one or more of other aspects described herein (e.g., the 41st, 42nd, or 43rd aspects), wherein the second SC requests a file lock on the first file, and the second FSD updates one of the first VID and a lock flag associated with the first VID to grant the file lock to the second guest. In accordance with a 51st exemplary aspect of the present disclosure, which may be used in combination with any one or more of other aspects described herein (e.g., the 50th aspect), wherein the first SC determines that the first file is being updated based on the one of the updated first VID and the lock flag.

In accordance with a 52nd exemplary aspect of the present disclosure, which may be used in combination with any one or more of other aspects described herein (e.g., the 41st, 42nd, or 43rd aspects), wherein the second guest updates second metadata of the first file in a second metadata cache of the second guest, and the second guest is configured to transfer the updated second metadata to the host memory after receiving the file lock. In accordance with a 53rd exemplary aspect of the present disclosure, which may be used in combination with any one or more of other aspects described herein (e.g., the 41st, 42nd, or 43rd aspects), wherein the first guest includes a guest memory device configured to provide access to files stored in the host memory that appears to applications executing on the first guest as a peripheral component interconnect device and the first SC is a component of one of (i) the guest memory device, and (ii) a driver of the guest memory device.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   a host with (i) a processor, (ii) a first guest, including a first storage controller (SC) and a paravirtualized storage device including a first metadata cache, associated with a first filesystem daemon (FSD) configured to communicate via a paravirtualization protocol, (iii) a second guest, including a second SC and a second metadata cache, associated with a second FSD, and (iv) a host memory storing a registration table (RT), where the RT is mapped into a first memory space of the first guest and a second memory space of the second guest, wherein the first SC is configured to:
   receive a first metadata request associated with a first file stored in the host memory;
   retrieve a first version identifier (VID) of first metadata associated with the first file from the first metadata cache;
   validate the first VID against a corresponding second VID in the RT;
   responsive to determining that the first VID matches the second VID, respond to the first metadata request based on the first metadata in the first metadata cache; and
   responsive to determining that the first VID fails to match the second VID, send a second metadata request to the first FSD via the paravirtualization protocol, based on the first metadata request, to update the first metadata;
   update the first VID to match the second VID; and
   respond to the first metadata request based on the updated first metadata.

2. The system of claim 1, wherein after the first SC responds to the first metadata request, the second SC is configured to:
   receive a first file update request to update the first file;
   send a second file update request based on the first file update request to the second FSD;
   wherein the second FSD is configured to:
     instruct an operating system of the host to commit a change to the first file; and
     update the second VID.

3. The system of claim 2, wherein the second file update request is sent via a filesystem queue accessible to both the second SC and the second FSD, and the filesystem queue is inaccessible to the first guest.

4. The system of claim 2, wherein updating the second VID includes incrementing a value of the second VID.

5. The system of claim 1, wherein the first FSD is configured to:
   receive a file request associated with a second file in the host memory, wherein the second file is unaccessed by any guest executing on the host; and
   responsive to receiving the file request, instruct a registration server to create a RT entry in the RT associated with the second file, wherein the RT entry includes a third VID associated with the second file and a file descriptor of the second file.

6. The system of claim 1, wherein a request to update a second file dependent on the first file results in an update to the second VID.

7. The system of claim 1, wherein a host memory address (HMA) of the first file is mapped to both a first guest memory address (GMA) of the first guest and a second GMA of the second guest, the first guest is configured to directly access the first file via the first GMA, and the second guest is configured to directly access the first file via the second GMA.

8. The system of claim 1, wherein a RT entry that includes the second VID is removed from the RT after all guests on the host terminate access to the first file.

9. The system of claim 1, wherein the first FSD responds to the second metadata request to the first SC based on the updated first metadata, and the first SC responds to the first metadata request based on the response from the first FSD.

10. The system of claim 1, wherein the first metadata request includes at least one of a metadata lookup, a path lookup, a directory contents lookup, and a symbolic link lookup.

11. A method comprising:
   receiving, by a first storage controller (SC) included in a first guest, a first metadata request associated with a first file stored in a host memory of a host of the first guest and a second guest;
   retrieving, by the first SC, a first version identifier (VID) of first metadata associated with the first file from a first metadata cache included in a paravirtualized storage device in the first guest;
   validating, by the first SC, the first VID against a corresponding second VID in a registration table (RT) stored in the host memory, wherein the RT is mapped into a first memory space of the first guest and a second memory space of the second guest;
   responsive to determining that the first VID matches the second VID, responding to the first metadata request based on the first metadata in the first metadata cache; and
   responsive to determining that the first VID fails to match the second VID, sending a second metadata request to a first filesystem daemon (FSD) via a paravirtualization protocol, based on the first metadata request, to update the first metadata;
   updating the first VID to match the second VID; and
   responding to the first metadata request based on the updated first metadata.

12. A system comprising:
   a host with (i) a processor, (ii) a first guest, including a first storage controller (SC) and a paravirtualized storage device including a first metadata cache, associated with a first filesystem daemon (FSD), (iii) a second guest associated with a second FSD, (iv) a registration server, and (v) a host memory with a registration table (RT), where the RT is mapped into a first memory space of the first guest and a second memory space of the second guest, wherein the registration server is configured to:

create a first RT entry associated with a first file stored in the host memory in the RT based on a file request associated with the first file received from the first SC by the first FSD;

set a first version identifier (VID) in the first RT entry to an initial value, wherein the second FSD is configured to:

update the first VID in response to the second guest requesting to modify the first file, and wherein the first SC is configured to:

determine that first metadata of the first file in the first metadata cache requires updating based on a corresponding second VID stored in the first metadata cache failing to match the updated first VID.

13. The system of claim 12, wherein the first SC is configured to:

receive a first metadata request associated with the first file;

retrieve the second VID from the first metadata cache;

validate the second VID against the first VID; and responsive to determining that the second VID matches the first VID, respond to the first metadata request based on the first metadata.

14. The system of claim 12, wherein the first SC is configured to:

receive a first metadata request associated with the first file;

retrieve the second VID from the first metadata cache;

validate the second VID against the first VID; and responsive to determining that the second VID fails to match the first VID, send a second metadata request to the first FSD to update the first metadata;

update the second VID to match the first VID; and respond to the first metadata request based on the updated first metadata.

15. The system of claim 12, wherein the first file request is sent via a filesystem queue accessible to both the first SC and the first FSD, and the filesystem queue is inaccessible to the second guest.

16. The system of claim 12, wherein a host memory address (HMA) of the first file is mapped to both a first guest memory address (GMA) of the first guest and a second GMA of the second guest, the first guest is configured to directly access the first file via the first GMA, and the second guest is configured to directly access the first file via the second GMA.

17. The system of claim 12, wherein the second SC requests a file lock on the first file, the second FSD updates one of the first VID and a lock flag associated with the first VID to grant the file lock to the second guest, and the first SC determines that the first file is being updated based on the one of the updated first VID and the lock flag.

18. The system of claim 17, wherein the second guest updates second metadata of the first file in a second metadata cache of the second guest, and the second guest is configured to transfer the updated second metadata to the host memory after receiving the file lock.

19. The system of claim 12, wherein the first guest includes a guest memory device configured to provide access to files stored in the host memory that appears to applications executing on the first guest as a peripheral component interconnect device and the first SC is a component of one of (i) the guest memory device, and (ii) a driver of the guest memory device.

* * * * *